United States Patent
Minabe et al.

(10) Patent No.: US 7,501,210 B2
(45) Date of Patent: *Mar. 10, 2009

(54) PHOTO-RESPONSIVE HIGH-MOLECULAR COMPOUND, PHOTO-RESPONSIVE HIGH-MOLECULAR COMPOSITION, DICARBOXYLIC ACID MONOMER, POLYESTER, OPTICAL RECORDING MEDIUM AND OPTICAL RECORD REPRODUCING DEVICE

(75) Inventors: Jiro Minabe, Ashigarakami-gun (JP); Tatsuya Maruyama, Ashigarakami-gun (JP); Katsunori Kawano, Ashigarakami-gun (JP); Shin Yasuda, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/696,017

(22) Filed: Apr. 3, 2007

(65) Prior Publication Data

US 2007/0184234 A1    Aug. 9, 2007

Related U.S. Application Data

(62) Division of application No. 10/454,690, filed on Jun. 5, 2003, now abandoned.

(30) Foreign Application Priority Data

Jun. 7, 2002 (JP) ............................. 2002-167796
May 1, 2003 (JP) ............................. 2003-126692

(51) Int. Cl.
  *G03H 1/02* (2006.01)
(52) U.S. Cl. .................................. 430/1; 430/2; 359/3
(58) Field of Classification Search ....................... None
  See application file for complete search history.

(56) References Cited

U.S. PATENT DOCUMENTS 2,699,394 A    1/1955    Gaspar (Continued)

FOREIGN PATENT DOCUMENTS

EP    0 172 517    2/1986

(Continued)

OTHER PUBLICATIONS

Yoneyama et al. "formation of intensity grating in a polymers liquid crystal with . . . ", J. Mater. Chem., vol. 11 pp. 3008-3013 (Oct. 2001).*

(Continued)

*Primary Examiner*—Martin J Angebranndt
(74) *Attorney, Agent, or Firm*—Oliff & Berridge, PLC

(57) ABSTRACT

In the present invention, a photosensitive layer of an optical recording medium includes a photo-responsive high-molecular compound comprising a photo-responsive group (e.g., an azobenzene derivative) which is geometrically isomerized by light radiation, and a liquid crystal linear mesogen group (e.g., a biphenyl derivative), wherein the photo-responsive group and the linear mesogen group are respectively bonded as side chains. The invention provides an optical recording medium enabling large scale recording by making the photosensitive layer thick without impairing recording characteristics. The photo-responsive high-molecular compound preferably comprises an aromatic ring on a main chain. Further, the photo-responsive high-molecular compound preferably comprises a structural unit which is capable of forming a liquid-crystalline or crystalline polymer and a structural unit which is capable of forming an amorphous polymer.

7 Claims, 7 Drawing Sheets

U.S. PATENT DOCUMENTS

| | | | |
|---|---|---|---|
| 4,795,664 | A | 1/1989 | DeMartino |
| 5,238,523 | A | 8/1993 | Yuasa et al. |
| 5,262,081 | A | 11/1993 | Gray et al. |
| 5,401,612 | A | 3/1995 | Etzbach et al. |
| 5,543,267 | A | 8/1996 | Stumpe et al. |
| 6,046,290 | A * | 4/2000 | Berneth et al. ............... 526/263 |
| 6,423,799 | B1 * | 7/2002 | Berneth et al. ........... 526/218.1 |
| 6,441,113 | B1 | 8/2002 | Berneth et al. |
| 6,512,085 | B1 * | 1/2003 | Minabe et al. ............... 528/480 |
| 7,022,460 | B2 | 4/2006 | Berneth et al. |
| 7,236,277 | B2 | 6/2007 | Kawano et al. |
| 2001/0002895 | A1 | 6/2001 | Kawano et al. |
| 2002/0163873 | A1 | 11/2002 | Kawano et al. |
| 2003/0049549 | A1 | 3/2003 | Hagen et al. |
| 2003/0141441 | A1 | 7/2003 | Kawano et al. |
| 2003/0156523 | A1 | 8/2003 | Wu et al. |
| 2003/0183959 | A1 | 10/2003 | Berneth et al. |
| 2003/0191240 | A1 | 10/2003 | Berneth et al. |
| 2004/0029038 | A1 | 2/2004 | Minabe et al. |
| 2004/0190093 | A1 | 9/2004 | Matsui et al. |
| 2004/0190094 | A1 | 9/2004 | Kawano et al. |
| 2004/0190095 | A1 | 9/2004 | Minabe et al. |
| 2004/0191684 | A1 | 9/2004 | Maruyama et al. |
| 2005/0206984 | A1 | 9/2005 | Kawano et al. |
| 2005/0208256 | A1 | 9/2005 | Yoshizawa et al. |
| 2005/0208387 | A1 * | 9/2005 | Minabe et al. ............... 430/1 |
| 2005/0228153 | A1 | 10/2005 | Minabe et al. |
| 2005/0265134 | A1 | 12/2005 | Minabe et al. |
| 2007/0117027 | A1 * | 5/2007 | Yoshizawa et al. ............. 430/1 |
| 2008/0013138 | A1 * | 1/2008 | Yoshizawa et al. ............. 359/3 |

FOREIGN PATENT DOCUMENTS

| | | | |
|---|---|---|---|
| JP | 02-280116 | | 11/1990 |
| JP | A-10-212324 | | 8/1998 |
| JP | 2000-109719 | | 4/2000 |
| JP | A-2000-264962 | | 9/2000 |
| JP | A-2000-514468 | | 10/2000 |
| JP | 2001201634 A | * | 7/2001 |
| JP | 2001-2946521 | | 10/2001 |
| JP | A-2001-290408 | | 10/2001 |
| JP | A-2002-37826 | | 2/2002 |
| JP | A-2002-174731 | | 6/2002 |
| JP | A-2002-539476 | | 11/2002 |
| WO | 97/44365 | * | 11/1997 |
| WO | WO 00/54112 | | 9/2000 |
| WO | WO 00/60586 | | 10/2000 |

OTHER PUBLICATIONS

Sato et al., "synthesis and properties of liquid crystalline semirigi polyesters . . ." Macromol. Chem. Phys., vol. 202(18) pp. 3634-3641 (2001).*

Imrie et al., "Induction of liquid crystallinity in blends of amorphous side chain polymers and their analogous co-polymers", Macromolecules 27(22), pp. 6673-6676 (1994).

Reck et al., "Combined liquid-crystalline polymers: rigid rod type . . . ", Makromol. Chem., vol. 190, pp. 2511-2526 (1989).

Sato et al., "Synthesis and properties of polyesters having cyanoazobenzene units in the side chain", Macromolecules. Rapid. Commun., vol. 15, pp. 21-29 (1994).

Sato et al., "Synthesis, thermal and phase conjugate properties of semirigid copolyesters with cyanoazobenzene . . . ", Macromolecules, Chem. Phys. vol. 196, pp. 2955-2967 (1995).

Wang et al., "Epoxy-Based Nonlinear Optical Polymers from Post Azo Coupling Reaction," *Macromolecules*, vol. 30, No. 2, 1997, pp. 219-225.

Hvilsted et al., "Side-chain liquid-crystalline polyesters for optical information storage," Optics Letters, vol. 17, No. 17, Sep. 1, 1992, pp. 1234-1236.

Natansohn et al., "Molecular Addressing? Selective Photoinduced Cooperative Motion of Polar Ester Groups in Copolymers Containing Azobenzene Groups," *Macromolecules*, vol. 31, No. 4, 1998, pp. 1155-1161.

Zilker et al., "Holographic recording in amorphous side-chain polymers: a comparison of two different design philosophies," Applied Physics B, vol. 68, 1999, pp. 893-897.

Ho et al., Azo Polymers for Reversible Optical Storage. 9. Copolymers Containing Two Types of Azobenzene Side Groups, *Macromolecules*, vol. 29, No. 1, 1996, pp. 44-49.

Minabe et al., "Design of Dye Concentrations in Azobenzene-Containing Polymer films for Volume Holographic Storage," Japanese Journal of Applied Physics, vol. 43, No. 7B, Jul. 2004, pp. 4964-4967.

Takeo Sasaki, Liquid Crystal Photorefractive Material, EKISHO (Journal of Japanese Liquid Crystal Society), Japan, Apr. 25, 2002, vol. 6, No. 2, pp. 168-180.

* cited by examiner

COPOLYMERIZATION RATIO OF CYANOBIPHENYL SIDE CHAIN y

COPOLYMERIZATION RATIO OF CYANOBIPHENYL SIDE CHAIN y

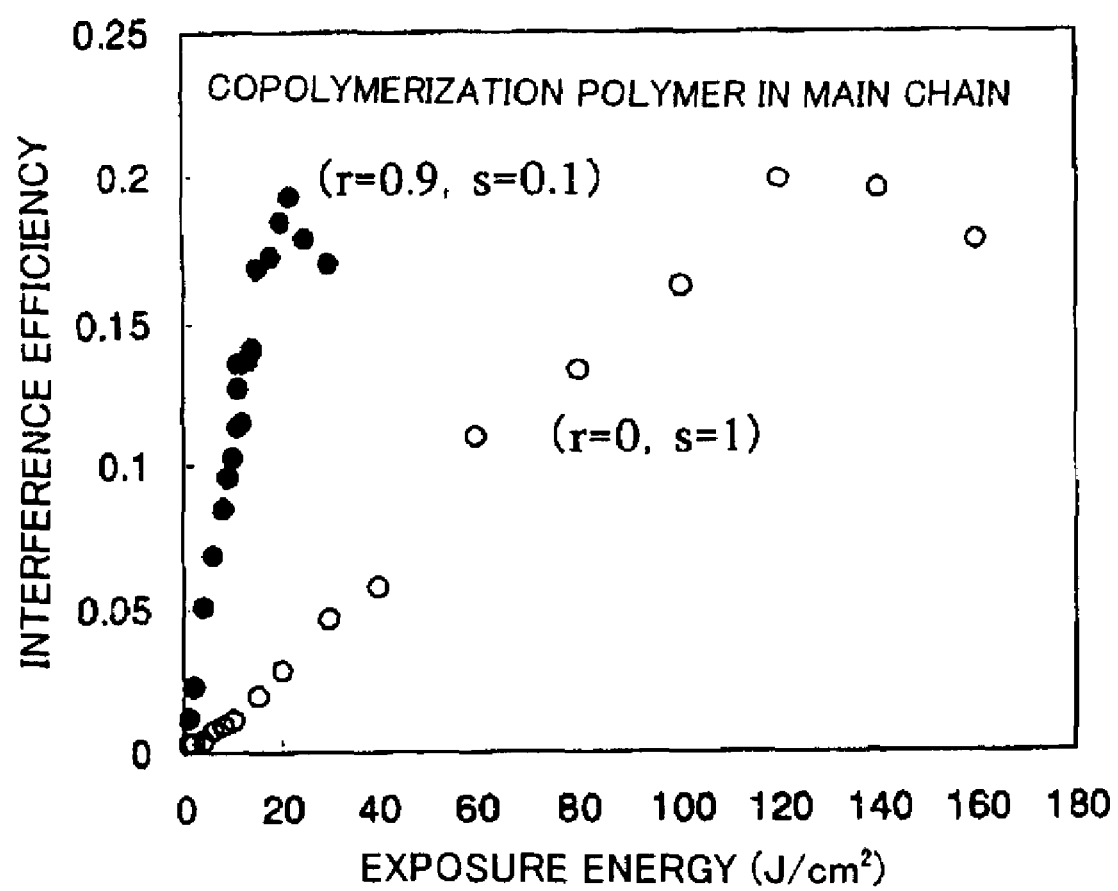

PHOTO-RESPONSIVE HIGH-MOLECULAR COMPOUND, PHOTO-RESPONSIVE HIGH-MOLECULAR COMPOSITION, DICARBOXYLIC ACID MONOMER, POLYESTER, OPTICAL RECORDING MEDIUM AND OPTICAL RECORD REPRODUCING DEVICE

CROSS-REFERENCE TO RELATED APPLICATIONS

This application is a divisional application of U.S. application Ser. No. 10/454,690, filed Jun. 5, 2003 now abandoned, incorporated herein by reference in its entirety. This application also claims benefit of and priority to Japanese Patent Applications Nos. 2002-167796 filed on Jun. 7, 2002 and 2203-126692 filed on May 1, 2003, each of which is incorporated herein by reference in its entirety.

BACKGROUND OF THE INVENTION

1. Field of the Invention

The present invention relates to an optical recording material, an optical recording medium and an optical record reproducing device, and, particularly, to a large scale volume type optical recording medium, optical recording materials and raw materials thereof, such as a photo-responsive high-molecular compound, a photo-responsive high-molecular composition, a dicarboxylic acid monomer and a polyester, which are used in the optical recording medium and an optical record reproducing device which records and reproduces information by using the optical recording medium.

2. Description of the Related Art

Rewritable optical disk recording devices such as phase change types and photomagnetic types have been widely spread already. However, these optical disks are not admitted to have performances coping with future demands for large scale recording to deal with an increase in scale along with a development of highly functional operating systems (OS) and application software, a trend to a huge scale on account of the spread of multimedia for various documents and data for presentation and digital recording of video signals of a long time animated cartoon with high precision and high density. In such a high density and large scale optical disk recording device, in order to increase recording density the ideas that, for example, the diameter of a beam spot is decreased to shorten an interval between neighboring trucks or neighboring bits are exploited.

DVD-ROMs are among those put to practical use by the development of such technologies. These DVD-ROMs store 4.7 Gbyte data on one surface of a disk 12 cm in size. Rewritable and erasable DVD-RAMs enables recording with a density as high as 5.2 Gbyte on both surfaces of a disk 12 cm in diameter by a phase change system. Namely, the DVD-RAM enables writing and reading of information with a capacity four times that of a CD-ROM or with a capacity corresponding to 1900 or more disks in the case of floppy disks. Like this, the optical disks are progressing in densification every year. However, on the other hand, because the aforementioned optical disks record data in a plane, the diffraction limit of light limits the recording, leading to the physical limit of high density recording. In order to develop a larger scale disk, three-dimensional (volume type) recording including recording in the direction of the depth is required.

As a volume type optical recording medium as mentioned above, a photorefractive material medium enabling volume recording of a holographic grating and the like are regarded as promising ones. Among photorefractive materials (hereinafter called "PR material"), those are known which have high sensitivity and therefore absorb relatively weak light on the same level as that of a solid laser with changing in refractive index. These photorefractive materials are expected to be applied to volume multiple hologram recording with the possibility that super-high density and super-large scale can be attained.

To state the principle of the photorefractive effect, two coherent light waves are applied to a PR material to form interference. An electron at a dobor level is excited to a conductive band in a place where light intensity is strong, moved by diffusion or drift and caught in a place where light intensity is weak. A positive charge remains in the place where light intensity is strong and a negative charge remains in the place where light intensity is weak. This allows a charge distribution to be formed, producing static electric field. A change in refractive index is caused as a result of the electrooptical effect of the static electric field. The period of the change in refractive index is the same as that of the interference fringe and the index modulation functions as a holographic grating.

As the PR material, inorganic ferroelectric crystals such as barium titanate, lithium niobate and bismuth silicate (BSO) have been frequently used. These materials produce a highly sensitive and highly efficient photo-induced index changing effect (photorefractive effect), but on the other hand, have drawbacks that many of them have a difficulty in crystal growth and are so hard and fragile that they are not processed into desired shapes and also have a difficulty in controlling their sensitive wavelengths.

In recent years, PR materials comprising organic materials have been proposed as those which overcome these drawbacks. Generally, organic PR materials comprise i) a charge generating material which receives light to produce a charge, ii) a charge transfer material which promotes the transfer of the generated charge in a medium, iii) a dichroic organic dye sensitive to the induced electric field by the charge transfer, iv) a high-molecular base material (binder) which supports these materials and v) additives (e.g., a plasticizer and a compatibility-improving agent) which change the physical properties of base materials. Also, there is the case where one component combines plural functions as, for example, a material doubling as a charge transfer material and a high-molecular base material and a material doubling as a charge transfer material and a plasticizer. The effects of these organic PR materials cause a positive and a negative charge to generate from the charge generating material which has absorbed light. These charges are separated into a positive charge and a negative charge by the charge transfer material when existing external electric field is effected, whereby an internal electric field is created. The internal electric field causes a change in the orientation of the dichroic dye, which causes a change in the distribution of refractive index in the base material. If such an organic PR material is applied, volume hologram recording with high recording density is considered to be possible in theory.

The organic PR material, however, has the problem that it is essential to apply an external electric field in substance. The electric field is as remarkably large as several hundreds V•mm$^{-1}$ which imposes a large restriction on devices when using the system as a recording device. Moreover, few different materials such as the charge generating material, the charge transfer material and the high-molecular base material are mixed and used in the material system, giving rise to a large problem concerning a reduction in stability caused by phase separation during recording or storage.

To avoid the foregoing problem, for instance, S. Hvilsted et al., proposes that using a polymer having cyanoazobenzene at a side chain, an index modulation is written therein to record holograms [Opt, Lett., 17 [17], 12 (1992)]. It has been clarified that in the material, an index modulation with 2500 high and low refractive indexes can be written in a space of 1 mm and it is expected that high recording density will be attained.

A holographic memory of a layer of a polymer having azobenzene at a side chain utilizes the photo-induced anisotropy of the polymer layer. Azobenzene in an amorphous azo polymer layer takes a random orientation state. When linearly polarized and excited light having a wavelength which corresponds to the absorption band belonging to the $\pi$-$\pi$* transition of an azo group is applied to the azo polymer layer, azobenzene as a trans isomer is excited in such a high probability that the transition dipole moment accords to the direction of the polarized light, namely, selectively, and is eventually photo-isomerized to a cis isomer. The excited cis isomer is isomerized again to a trans isomer by light or heat.

A change in the orientation of azobenzene is caused in a direction stable to the excited light, namely a direction perpendicular to the direction of the polarization through such an angle-selective trans-cis-trans isomerization cycle caused by the application of polarized light. Because azobenzene has an optical anisotropy, it exhibits birefringence and dichroism as a result of a change in orientation. Utilizing the photo-induced anisotropy makes it possible to record a hologram by the distribution of intensity and the distribution of polarization. Because the recording is based on a change in the orientation of the polymer, it is carried out stably for a long period of time and a hologram can be recorded repeatedly by erasing the recorded hologram by applying circularly polarized light or by applying heat to an isotropic phase. As a material for a rewritable type holographic memory, a layer of the polymer having azobenzene at a side chain is a most promising material type.

For instance, the inventors of the invention have proposed polyesters having azobenzene, which is useful as an optical recording material, at the side chain in Japanese Patent Application Laid-Open (JP-A) Nos. 2000-109719, 2000-264962 and 2001-294652. In JP-A No. 2000-109719, a monomer and a polyester in which a methyl group is introduced into azobenzene to control the absorption band to within a range suitable for optical recording and optical recording media using these monomer and polyester are disclosed. Also, in JP-A No. 2000-264962, a polyester which is made suitable to optical recording by defining a methylene chain as a main chain and by controlling the glass transition temperature of a polymer and optical recording media using the polyester are proposed. In addition, in JP-A No. 2001-294652, it is disclosed that optical recording characteristics is improved using a polyester in which a methylene chain as a side chain is defined.

"A development of thick recording media" is most important to attain the development of a large scale volume type holographic memory. Generally, the condition of incident angle necessary for diffraction becomes more strict with an increase in the thickness of a hologram. Namely, diffracted light diminishes only by a small deviation of the incident condition from the Bragg's condition. The angle multiplex system in the volume type holographic memory makes use of the angular selectivity. Namely, plural holograms are formed in the same volume and the incident angle of reading light is controlled whereby a desired hologram can be read out without any crosstalk. If the angle selectivity is improved by increasing the thickness of a recording medium in this manner, multiplicity can be raised and recording capacity can be increased accordingly.

Also, the magnitude of modulation of refractive index for forming a hologram is limited by the capability of a medium material. For this, the formation of plural holograms in the same volume corresponds to the fact that the capability of modulation of refractive index which a material possesses is divided by plural holograms upon use. Because the square of the amplitude of refractive index acts on diffraction efficiency, a rise in multiplicity reduces the diffraction efficiency of a hologram in inverse proportion to the square of the multiplicity. Accordingly, it is desired to develop recording media which can obtain a high diffraction efficiency raised to some extent also in the case of raising the multiplicity.

On the other hand, in the case of the layer of a polymer having azobenzene at a side chain, it is necessary to record using a wavelength enough to excite the $\pi$-$\pi$* transition of azobenzene. Although it is effective to select wavelengths which can be highly absorbed to improve recording sensitivity, this gives rise to another problem at the same time. Namely, if a material which highly absorbs light with a recording wavelength is used, incident recording light is absorbed by molecules in the vicinity of the surface, with the result that an effective hologram cannot be formed over a whole region extending in the direction of the thickness of a medium. Further, the absorption loss of the medium makes it difficult to attain high diffraction efficiency. Accordingly, in order to accomplish a rise in thickness with maintaining high recording sensitivity and high diffraction efficiency, it is important to control the absorbance of a medium (the amount of light to be absorbed) for recording wavelengths.

Also, the magnitude and stability of the photo-induced anisotropy (birefringence) of the layer of a polymer having, at a side chain, azobenzene to be a source of the formation of a hologram are largely affected by the thermal properties of the polymer. In general, the photo-induced birefringence of an amorphous polymer is relatively small and has inferior record retentivity. On the contrary, the photo-induced birefringence of a crystalline or liquid crystalline polymer is relatively large, is stable to heat and has superb record retentivity. However, these crystalline and liquid crystalline polymer layers are increased in thickness, noises due to scattering caused by the crystal are increased, posing the problem that errors are produced when reading out data. From such a problem, the thickness of the film of a polymer having azobenzene at a side chain has been limited to about the order of 20 μm to 40 μm when applying it to a holographic memory. Accordingly, it is important to control the crystallinity of the polymer to attain an increase in layer thickness while maintaining high record retentivity and preventing the generation of noises.

The invention has been made in view of the aforementioned prior art problem and it is an object of the invention to provide an optical recording material (e.g., a photo-responsive high-molecular compound, a photo-responsive high-molecular composition or a polyester) which can be increased in layer thickness while maintaining high recording sensitivity and high diffraction efficiency by controlling the absorbance of a medium and also to provide its raw material (dicarboxylic acid monomer). Another object of the invention is to provide an optical recording material which can be increased in the layer thickness while maintaining high record retentivity and preventing the generation of noises by controlling the crystallinity of the material and also to provide its raw material. Also, a further object of the invention is to provide an optical recording medium enabling large scale recording by accomplishing an increase in layer thickness without damaging recording characteristics. A still further object of the invention is to provide an optical record reproducing device enabling recording and reproduction of large scale data.

SUMMARY OF THE INVENTION

Optical Recording Material

The above object can be attained by the following invention. As a first aspect of a photo-responsive high-molecular compound and a first aspect of a photo-responsive high-molecular composition of the present invention, a photo-responsive high-molecular compound comprising a photo-responsive group which is geometrically isomerized by light radiation, and a liquid crystal linear mesogen group, wherein the photo-responsive group and the linear mesogen group are respectively bonded as side chains, is provided. Also, as a first aspect of a photo-responsive high-molecular composition of the present invention, a photo-responsive high-molecular composition which comprises a photo-responsive high-molecular compound comprising a photo-responsive group which is geometrically isomerized by light radiation, and a liquid crystal linear mesogen group, wherein the photo-responsive group and the linear mesogen group are respectively bonded as side chains, is provided.

As examples of the photo-responsive group which is geometrically isomerized by light radiation in the above compound and composition according to the first aspects, those containing an azobenzene skeleton, a stilbene skeleton or an azomethine skeleton are given. The photo-responsive group preferably contains an azobenzene skeleton. The liquid crystal linear mesogen group may be those used as a mesogen group of usual low molecular liquid crystals such as a biphenyl type, terphenyl group, benzoate type, cyclohexylcarboxylate type, phenylcyclohexane type, pyrimidine type, dioxane type and cyclohexylcyclohexane type containing a p (para)-substituted aromatic ring. The linear mesogen group preferably contains a biphenyl skeleton.

The photo-responsive high-molecular compound and the photo-responsive composition according to the first aspects of the invention have the following characteristics (1): (1) The introduction of the "liquid crystal linear mesogen group" such as a biphenyl derivative makes it possible to reinforce and to fix a change in the orientation of the "photo-responsive group which is geometrically isomerized by light radiation" by light. Namely, the introduction of the "liquid crystal linear mesogen group" which is not geometrically isomerized makes it possible to control the absorbance of a medium to thereby decrease absorption loss and also to maintain high recording sensitivity and high diffraction efficiency owing to its orientation characteristics. This makes it possible to attain an increase in thickness. It is to be noted that in the case of the photo-responsive high-molecular compound, the "liquid crystal linear mesogen group" can be introduced into the same molecule by copolymerization or the like. Also, in the case of the photo-responsive high-molecular composition, the "liquid crystal linear mesogen group" can be introduced into the composition by blending a photo-unresponsive high-molecular compound having the "liquid crystal linear mesogen group".

For example, biphenyl derivatives bonded by a flexible methylene chain function as a mesogen in a liquid crystal state. Accordingly, it is possible to induce a change in the orientation of the biphenyl derivative followed in a change of the orientation of azobenzene. Although it is necessary to decrease the absorbance of a medium in order to attain a thick medium, the decrease in the absorbance of a medium directly implies that the magnitude of photo-induced anisotropy and sensitivity are sacrificed. However, the introduction of the biphenyl derivative into the side chain makes it possible to enforce and to fix a change in the orientation of azobenzene.

Also, the above object can be attained by the following invention. As a second aspect of the invention, a photo-responsive high-molecular compound comprising an aromatic ring on a main chain, a photo-responsive group which is geometrically isomerized by light radiation, and a liquid crystal linear mesogen group, wherein the photo-responsive group and the liquid crystal linear mesogen group are respectively bonded with the aromatic ring as side chains, is provided. Also, As a photo-responsive high-molecular composition of the second aspect of the invention, a photo-responsive high-molecular composition comprising a photo-responsive high-molecular compound which contains an aromatic ring on a main chain and a photo-responsive group, which is geometrically isomerized by light radiation, as a side chain of the aromatic ring, and a photo-unresponsive high-molecular compound which contains an aromatic ring on a main chain and a liquid crystal linear mesogen group as a side chain of the aromatic ring, is provided.

As examples of each of the photo-responsive group which is geometrically isomerized by light radiation and the liquid crystal linear mesogen group in the above photo-responsive compound and the photo-responsive composition of the second aspects, the same groups as those exemplified as the photo-responsive compound and the photo-responsive composition of the first aspects may be given. Also, examples of the high-molecular compound containing an aromatic ring on its main chain include polyesters obtained by a polycondensation between a dicarboxylic acid such as phthalic acid or isophthalic acid and a diol.

The photo-responsive high-molecular compound and the photo-responsive high-molecular composition according to the second aspects of the invention are provided with the following characteristics (2) in addition to the above characteristics (1): (2) The side chain is bonded with the "aromatic ring", such as isophthalic acid derivatives, which is fixed to the main chain, so that the crystallinity of the polymer is easily controlled by the presence of the "aromatic ring" at the bonded part. Namely, the crystallinity is controlled by the "aromatic ring" present at the bonded part of the side chain to thereby maintain high record retentivity and to prevent the generation of noises, whereby an increase in layer thickness can be attained.

Generally, many polymers having azobenzene at the side chain exhibit a liquid crystal phase such as a nematic phase or a smectic phase because the azobenzene side chain functions as a mesogen. As aforementioned, it is difficult to increase the layer thickness of the liquid crystal polymers because of the noises caused by scattering. The crystallinity of a polyesters having side chains bonded with aromatic rings can be easily controlled between a liquid crystal state and an amorphous state according to the structure of its main chain. This is assumed to be because of a structure in which the mobility of the side chain is limited by the presence of the "aromatic ring" such as an isophthalic acid derivative and therefore the polyester group takes a liquid crystal phase with more difficulty than the polymer in which no aromatic ring is present at the bonded part (even if the polyester group has a liquid crystal phase, the range of the temperature at which it takes a crystal state is narrow).

In addition to the foregoing characteristics (1) and (2), the photo-responsive high-molecular compound and photo-responsive high-molecular composition of the third aspects of the invention have the following useful characteristic (3) to control crystallinity. (3) It is possible to control continuous crystallinity easily by introducing a structural unit capable of forming a liquid-crystalline or crystalline polymer and a structural unit capable of forming an amorphous polymer simultaneously into the main chain of the same molecule and by changing the ratio of the both structural units. Moreover, as will be described in examples in detail, it has been found that there is a copolymerization ratio to increase photo-induced birefringence with decreasing scattering caused by crystallinity exists. Therefore, by obtaining of the characteristics (3), it becomes possible to achieve both a reduction in scattering and an improvement in photo-induced anisotropy which have been considered to be in a tradeoff relation with each other. This enables the production of a thick film medium superior in record retentivity.

As the raw monomer for introducing the liquid crystal linear mesogen group, a dicarboxylic acid monomer represented by the following general formula (1) maybe used. The dicarboxylic acid monomer is useful to control the amount of absorption of a compound or a composition without impairing the optical recording characteristics of an optical recording material.

General formula (1)

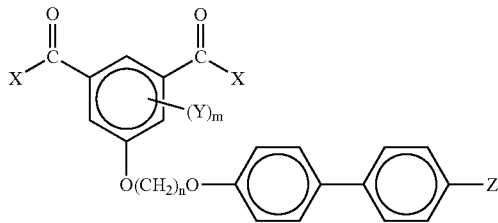

wherein X represents a lower alkyloxy group, a substituted or unsubstituted benzyloxy group, a substituted or unsubstituted phenyloxy group, an acid residue of a lower fatty acid, an acid residue of a substituted or unsubstituted benzoic acid or a halogen atom, Y represents a hydrogen atom or a lower alkyl group, Z represents a hydrogen atom, a methyl group, a methoxy group, a cyano group or a nitro group, m denotes an integer from 1 to 3 and n denotes an integer from 2 to 18.

The dicarboxylic acid monomer represented by the above general formula (1) can be produced by reacting a dicarboxylic acid derivative represented by the following general formula (2) with a biphenyl derivative represented by the following general formula (3) in the presence of a condensing agent.

General formula (2)

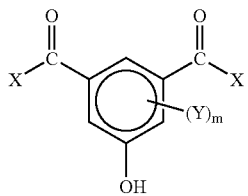

General formula (3)

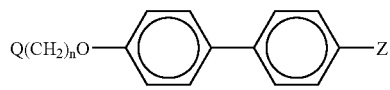

In the above general formula (2), X represents a lower alkyloxy group, a substituted or unsubstituted benzyloxy group, a substituted or unsubstituted phenyloxy group, an acid residue of a lower fatty acid, an acid residue of a substituted or unsubstituted benzoic acid or a halogen atom, Y represents a hydrogen atom or a lower alkyl group and m denotes an integer from 1 to 3.

In the above general formula (3), Q represents an atomic group which is easily dissociable by the effect of a nucleophilic substitution reaction in the condition of the Williamson's ether synthetic reaction, Z represents a hydrogen atom, a methyl group, a methoxy group, a cyano group or a nitro group and n denotes an integer from 2 to 18.

As the aforementioned photo-unresponsive high-molecular compound, a polyester represented by the following general formula (4) may be used. The polyester is useful as a binder polymer which controls the amount of absorption of a dye (dye concentration) without impairing optical recording characteristics.

General formula (4)

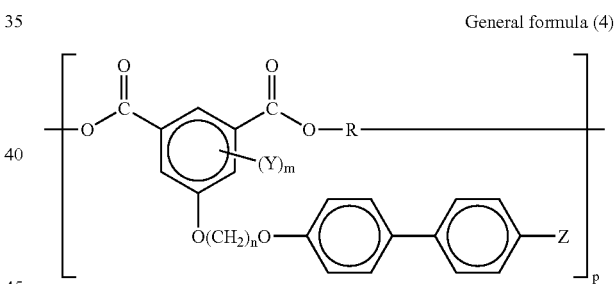

In the above general formula (4), Y represents a hydrogen atom or a lower alkyl group; Z represents a hydrogen atom, a methyl group, a methoxy group, a cyano group, or a nitro group; R represents a hydrocarbon chain which may contain at least one of a substituted or unsubstituted aromatic group and a substituted or unsubstituted aliphatic group; m denotes an integer from 1 to 3; n denotes an integer from 2 to 18; and p denotes an integer from 5 to 2000. Also, R in the above general formula (4) preferably includes a structural unit which is capable of forming a liquid-crystalline or crystalline polymer and a structural unit which is capable of forming an amorphous polymer. More preferably, R in the above general formula (4) is a functional group represented by the following general formula (5).

General formula (5)

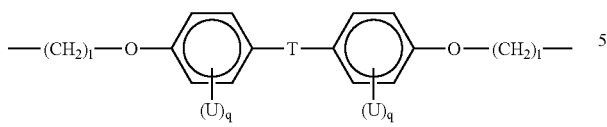

In the above general formula (5), U represents a hydrogen atom, a halogen atom, a substituted or unsubstituted lower alkyl group, a substituted or unsubstituted lower alkenyl group or a substituted or unsubstituted lower alkinyl group; T represents a direct bond, a sulfone bond, a sulfoxide bond, an ether bond, a thioether bond, a substituted imino bond or a ketone bond; q denotes an integer from 1 to 4; and l denotes an integer from 2 to 18.

As the aforementioned photo-responsive high-molecular compound, a polyester comprising a repeat unit represented by the following general formula (6) maybe used. The copolymer obtained by copolymerization with the azobenzene derivative is very useful as an optical recording material constituting a photosensitive layer with high layer thickness in the optical recording medium.

General formula (7)

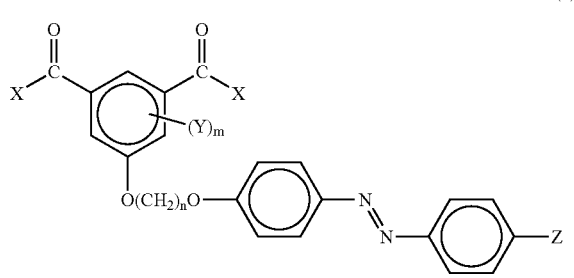

General formula (8)

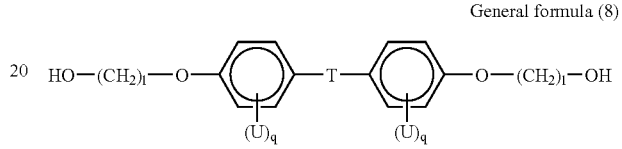

General formula (6)

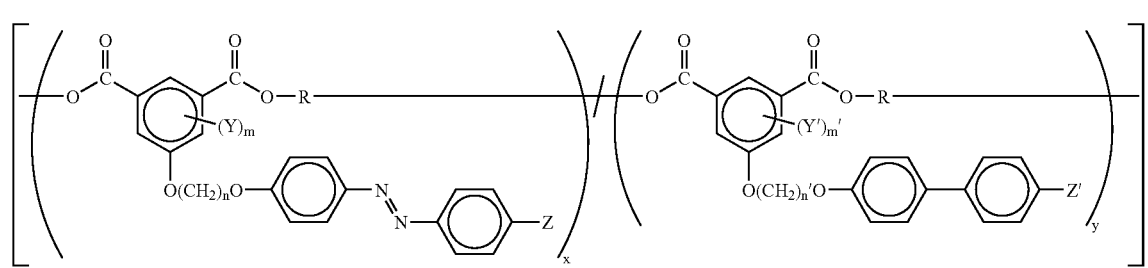

In the above general formula (6), Y and Y' each independently represent a hydrogen atom or a lower alkyl group, Z and Z' each independently represent a hydrogen atom, a methyl group, a methoxy group, a cyano group or a nitro group, R represents a hydrocarbon chain containing a substituted or unsubstituted aromatic group, a substituted or unsubstituted aliphatic group or both, m and m' each independently denote an integer from 1 to 3, n and n' each independently denote an integer from 2 to 18, p denotes an integer from 5 to 2000 and x and y respectively represent abundance ratios of the repeat unit and fulfill the following relationships: $0 < x \leq 1$, $0 \leq y < 1$ and $x+y=1$. Also, R in the above general formula (6) preferably includes a structural unit which is capable of forming a liquid-crystalline or crystalline polymer and a structural unit which is capable of forming an amorphous polymer. More preferably, R in the above general formula (6) is represented by the above general formula (5).

The polyester represented by the above general formula (6) may be obtained by reacting a dicarboxylic acid monomer represented by the above general formula (1) with a photo-responsive dicarboxylic acid monomer represented by the following general formula (7) and with a diol compound represented by the following general formula (8) in the presence of a proper catalyst.

In the general formula (7), X represents a lower alkyloxy group, a substituted or unsubstituted benzyloxy group, a substituted or unsubstituted phenyloxy group, an acid residue of a lower fatty acid, an acid residue of a substituted or unsubstituted benzoic acid or a halogen atom, Y represents a hydrogen atom or a lower alkyl group, Z represents a hydrogen atom, a methyl group, a methoxy group, a cyano group, or a nitro group, m denotes an integer from 1 to 3 and n denotes an integer from 2 to 18.

In the general formula (8), U represents a hydrogen atom, a halogen atom, a substituted or unsubstituted lower alkyl group, a substituted or unsubstituted lower alkenyl group, or a substituted or unsubstituted lower alkinyl group, T represents a sulfone bond, a sulfoxide bond, an ether bond, a thioether bond, a substituted imino bond, or a ketone bond, q denotes an integer from 1 to 4 and l denotes an integer from 2 to 18.

As the aforementioned photo-responsive high-molecular compound, it is particularly preferable to use a polyester composed of a repeat unit represented by the following general formula (10). The crystallinity of a copolymer of this compound and an azobenzene derivative is easily controlled by the ratio between the structural units $R_1$ and $R_2$ of the main chain and is therefore useful as an optical recording material constituting a thick light-sensitive layer of the optical recording medium.

General formula 10

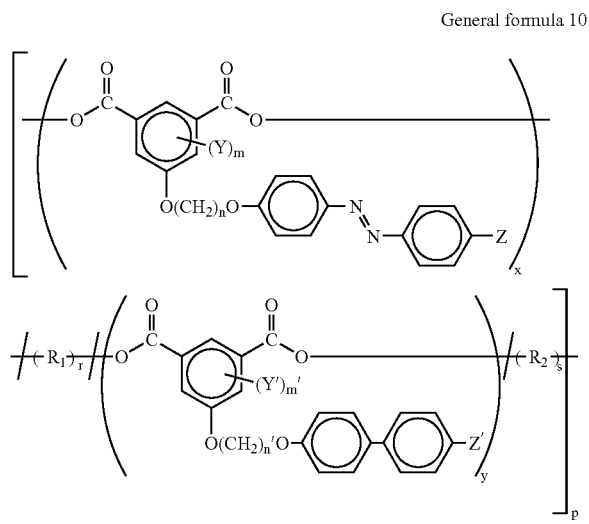

In the general formula (10), $R_1$ represents a structural unit capable of forming a liquid-crystalline or crystalline polymer; $R_2$ represents a structural unit capable of forming an amorphous polymer; Y and Y' respectively represent a hydrogen atom or a lower alkyl group; Z and Z' each independently represent a hydrogen atom, a methyl group, a methoxy group, a cyano group or a nitro group; R represents a hydrocarbon chain including a substituted or unsubstituted aromatic group, a substituted or unsubstituted aliphatic group or both of a substituted or unsubstituted aromatic group and a substituted or unsubstituted aliphatic group; m and m' each independently represent an integer from 1 to 3; n and n' each independently represent an integer from 2 to 18; and p represents an integer from 5 to 2000; x, y, r and s each independently represent the abundance ratio of the repeat unit wherein x, y, r and s satisfy the following relations: $0 < x \leq 1$, $0 \leq y < 1$, $x+y=1$, $0 \leq r \leq 1$, $0 \leq s \leq 1$ and $r+s=1$.

The polyester represented by the general formula (10) may be obtained by reacting the dicarboxylic acid monomer represented by the general formula (1), the photo-responsive dicarboxylic acid monomer represented by the general formula (7) and two types of diol compounds represented by the general formula (8) in the presence of an adequate catalyst.

Optical Recording Medium

The above object can be attained by the following invention. According to a third aspect of the invention, an optical recording medium provided with a photosensitive layer comprising the photo-responsive high-molecular compound or the photo-responsive high-molecular composition of the invention, wherein information is recorded in the photosensitive layer by utilizing at least one of a change in absorption, a change in refractive index, and a change in shape, due to light radiation, is provided. Also, the invention provides an optical recording medium having a photosensitive layer comprising the polyester according to the invention, wherein information is recorded in the photosensitive layer by utilizing at least one of a change in absorption, a change in refractive index, and a change in shape, due to light radiation.

In the optical recording medium of the invention, the foregoing optical recording material (the photo-responsive high-molecular compound, the photo-responsive high-molecular composition and the polyester) is used to control the absorbance of a medium and crystallinity, whereby a thick photosensitive layer can be formed without impairing recording characteristics. It is possible to form a layer as thick as, for example, 50 μm. This enables large scale recording. It is undesirable that the photosensitive layer constituted of the above optical recording material exhibit a thermotropic liquid crystal phase.

A hologram can be recorded in the optical recording medium of the invention. For example, recording of a hologram is independently possible in each of a case where a polarization direction of light that is incident on an object and a polarization direction of reference light are parallel to each other, and a case where polarization direction of light that is incident on an object and a polarization direction of reference light are perpendicular to each other. Also, recording of a hologram by the amplitude, phase and direction of polarization of object light is possible.

Optical Record Reproducing Device

The above object can be attained by the following invention. According to a fourth aspect of the invention, there is provided an optical record reproducing device recording and/or reproducing information by using an optical recording medium according to the invention. The optical record reproducing device makes it possible to record and reproduce large scale data because an optical recording medium enabling large scale recording according to the invention is used.

BRIEF DESCRIPTION OF THE DRAWINGS

FIG. 13 is a diagram showing that the sensitivity of hologram recording is improved by controlling crystallinity by means of the copolymerization of the main chain-consisting monomer.

DETAILED DESCRIPTION OF THE PREFERRED EMBODIMENTS

Figure 1:
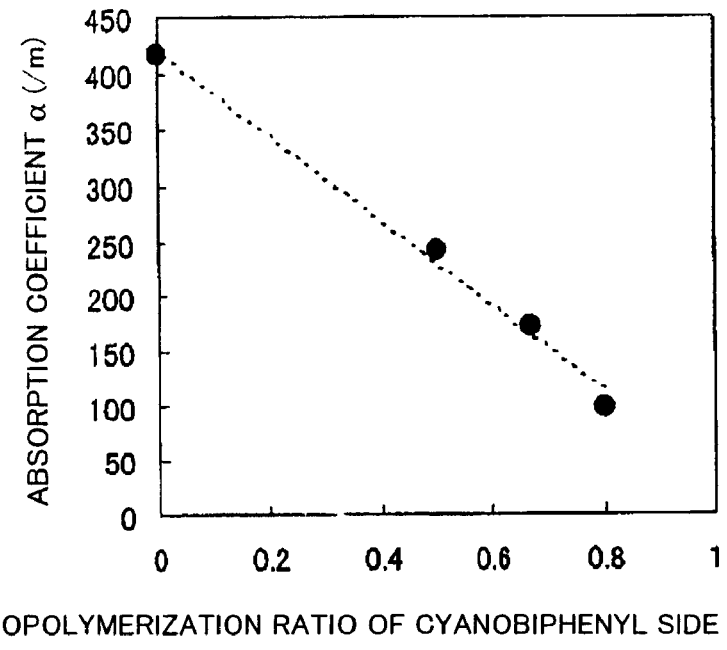
FIG. 1 is a diagram showing a change in the absorption coefficient of a photo-responsive polyester carrying a biphenyl derivative for light with a wavelength of 515 nm as a function of the copolymerization ratio of a side chain of a biphenyl derivative in the present invention.

Embodiments of the present invention will be explained in detail.

Optical Recording Material

Dicarboxylic Acid Monomer

A dicarboxylic acid monomer according to the invention and represented by the following general formula (1) will be exemplified.

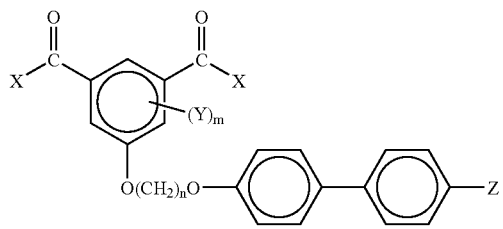

General formula (1)

In the general formula (1), X represents a lower alkyloxy group, a substituted or unsubstituted benzyloxy group, a substituted or unsubstituted phenyloxy group, an acid residue of a lower fatty acid, an acid residue of a substituted or unsubstituted benzoic acid, or a halogen atom. Among these groups, a lower alkyloxy group, a substituted or unsubstituted phenyloxy group, an acid residue of a lower fatty acid and a halogen atom are preferable. Examples of the substituent include a methyl group, ethyl group, halogen atom and cyano group.

Examples of the lower alkyloxy group include a hydroxy group, methyloxy group and ethyloxy group. Examples of the benzyloxy group include a benzyloxy group, methylbenzyloxy group, ethylbenzyloxy group and chlorobenzyloxy group. Examples of the phenyloxy group include a phenyloxy group, methylphenyloxy group, ethylphenyloxy group and chlorophenyloxy group. Examples of the acid residue of a lower fatty acid include an acetyloxy group, chloroacetyloxy group, fluoroacetyloxy group, trifluoroacetyloxy group and cyanoacetyloxy group. Examples of the acid residue of benzoic acid include a benzoyloxy group, chlorobenzoyloxy group, fluorobenzoyloxy group and cyanobenzoyloxy group. Examples of the halogen atom include a chlorine atom and bromine atom.

In the general formula (1), Y represents a hydrogen atom or a lower alkyl group. Examples of the lower alkyl group include a methyl group, ethyl group and propyl group. Z represents a hydrogen atom, a methyl group, a methoxy group, a cyano group or a nitro group. m denotes an integer from 1 to 3 and preferably 1. n denotes an integer from 2 to 18 and preferably 4 to 12.

The dicarboxylic acid monomer represented by the above general formula (1) can be produced by reacting a dicarboxylic acid derivative represented by the following general formula (2) with a biphenyl derivative represented by the following general formula (3) in the presence of a condensing agent.

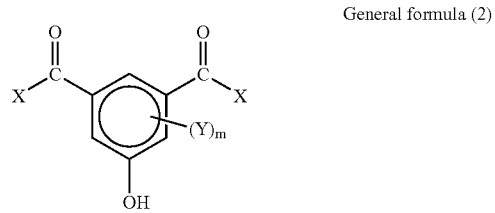

General formula (2)

X, Y and m in the general formula (2) are respectively the same as X, Y and m in the general formula (1).

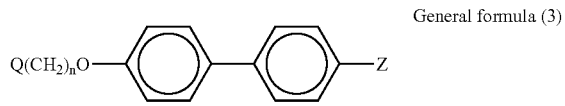

General formula (3)

In the general formula (3), Q represents an atomic group which is easily dissociable by the effect of a nucleophilic substitution reaction in the condition of an ether synthetic reaction. Examples of the atomic group which is easily dissociable by the effect of a nucleophilic substitution reaction in the condition of an ether synthetic reaction include a halogen atom, a tosyl group and a trifluoroacetyloxy group. Among these groups, a bromine atom and tosyl group are preferable. In the general formula (3), Z represents a hydrogen atom, a methyl group, a methoxy group, a cyano group or a nitro group and n denotes an integer from 2 to 18 and preferably 4 to 12.

Examples of the aforementioned condensing agent include sodium hydroxide, potassium hydroxide, sodium carbonate, sodium bicarbonate, potassium carbonate, potassium bicarbonate, triethylamine, tributylamine, pyridine and 1,8-diaza[5,40] bicyclo-undecene-7. Among these groups, potassium bicarbonate, triethylamine and 1,8-diaza[5,40] bicyclo-undecene-7 are preferable.

Binder Polymer

Next, the polyester of the invention represented by the following general formula (4) will be explained. The polyester is a novel compound and may be used as a binder polymer for controlling the concentration of a dye.

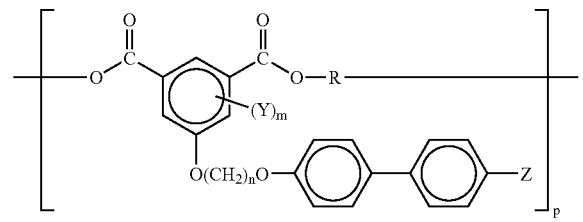

General formula (4)

In the general formula (4), Y, Z, m and n are each independently represent the same as Y, Z, m and n in the general formula (1), p denotes an integer from 5 to 2000, preferably 5 to 500 and more preferably 10 to 100. R represents a hydrocarbon chain which may contain at least one of a substituted or unsubstituted aromatic group and a substituted or unsubstituted aliphatic group. The structure of R of the main chain portion decides the crystallinity of the polymer. Examples of the substituent include a methyl group, ethyl group, hydroxy group, methoxy group, ethoxy group and chlorine atom. Examples of the aforementioned hydrocarbon chain containing a substituted or unsubstituted aromatic group or aliphatic group or the both include the following structures.

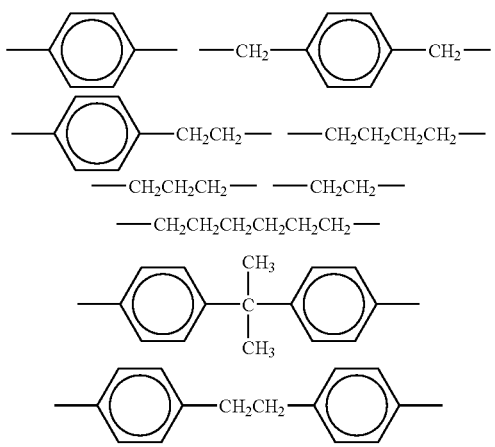

The hydrocarbon chain containing a substituted or unsubstituted aromatic group or aliphatic group or the both may include a difunctional atomic group containing a hetero atom (hereinafter referred to as a difunctional atomic group containing a hetero atomic group) such as a sulfone bond, sulfoxide bond, ether bond, thioether bond, substituted imino bond and ketone bond.

As examples of the hydrocarbon chain containing a substituted or unsubstituted aromatic group or aliphatic group or the both and containing a difunctional atomic group containing a hetero atom group, functional groups represented by the following formulae (5) and (5-a) to (5-d) are given. Among these groups, functional groups represented by the following general formula (5) are preferable. As the functional group represented by the following general formula (5), functional groups represented by the following general formula (5-d) are preferable.

General formula (5)

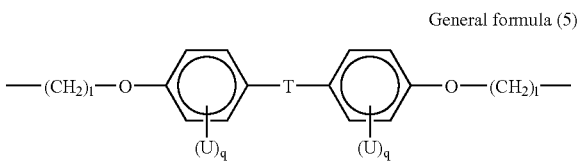

General formula (5-a)

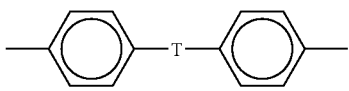

General formula (5-b)

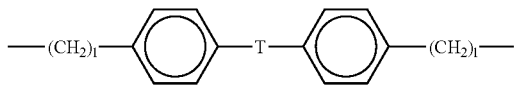

General formula (5-c)

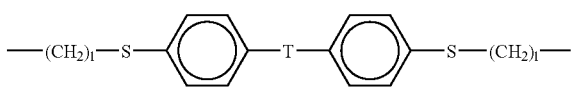

General formula (5-d)

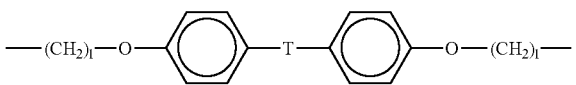

In the general formula (5), U represents a hydrogen atom, a halogen atom, a substituted or unsubstituted lower alkyl group, a substituted or unsubstituted lower alkenyl group or a substituted or unsubstituted lower alkinyl group. Among these groups, a lower alkyl group is preferable. Examples of the substituent include a hydrogen atom, fluorine atom, chlorine atom and alkyl group. Examples of the aforementioned halogen atom and lower alkyl group are the same as those exemplified above. Examples of the lower alkenyl group include a vinyl group. Examples of the lower alkinyl group include a propargyl group.

In the formulae (5) and (5-a) to (5-d), T represents a direct bond, a sulfone bond, a sulfoxide bond, an ether bond, a thioether bond, a substituted imino bond or a ketone bond. Among these bonds, a sulfon bond, ether bond and ketone bond are preferable. In the general formula (5), q denotes an integer from 1 to 4 and preferably 1 or 2. In the general formula (5), l denotes an integer from 2 to 18 and preferably 4 to 10. Also, l in the formulae (5-b) to (5-d) are the same.

The polyester represented by the general formula (4) may be synthesized in the following manner. Isophthalic acid derivatives represented by the following compound (1) which is a kind of dicarboxylic acid represented by the general formula (1) is led to a polyester provided with a biphenyl derivative bonded with the side chain thereof by condensing with various aliphatic diols, diols containing an aromatic ring and bisphenol in an appropriate condition in the same manner as in the case of a usual diester of an aromatic dicarboxylic acid. For example, the isophthalic acid derivative is reacted with diols derived from a bisphenol compound represented by the following general formula (8) by a high-temperature polycondensation method based on ester exchange to thereby synthesize a polyester compound represented by the following general formula (9) which is a kind of polyester represented by the general formula (4). In this case, if a known reaction catalyst, such as calcium acetate, zinc acetate or antimony oxide, is used which is regarded as an effective one in a high-temperature polycondensation reaction based on ester exchange, a better result is obtained.

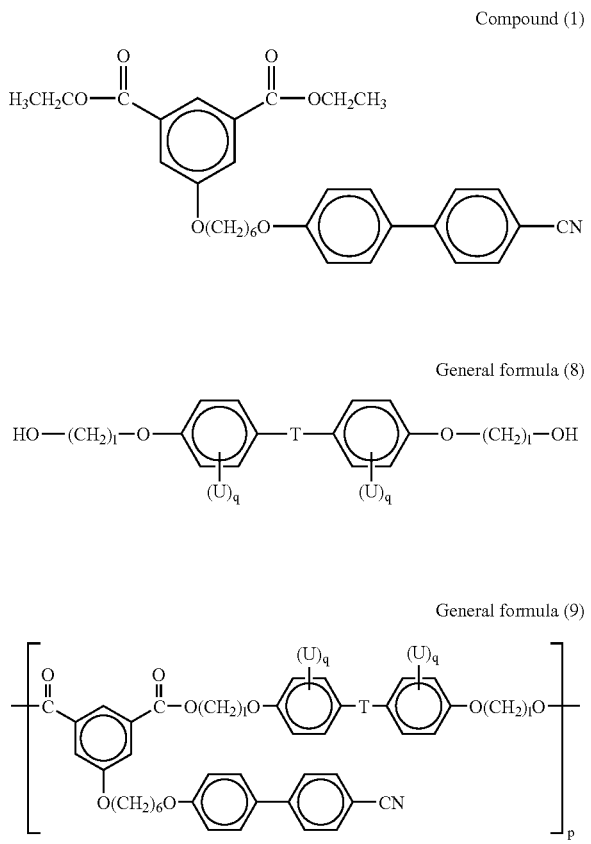

Compound (1)

General formula (8)

General formula (9)

In the formulae (8) and (9), U, T, q and l are each independently the same as U, T, q and l in the general formula (5). Also, p in the general formula (9) is the same as p in the general formula (4).

Photo-responsive Polymer

Next, the polyester of the invention which is represented by the following general formula (6) will be explained. The polyester is a novel compound and may be used as a photo-responsive polymer.

general formula (4), Z and Z', which may be the same or different and are each independently the same as Z in the general formula (4), R is the same as R in the general formula (4) and the structure of R of the main chain decides the crystallinity of the polymer, m and m', which may be the same or different and are each independently the same as m in the general formula (4), n and n', which may be the same or different and are each independently the same as n in the general formula (4), p is the same as p in the general formula (4) and x and y represent abundance ratios of the repeat unit and fulfill the following relationships: $0<x\leqq1$, $0\leqq y<1$ and $x+y=1$.

The polyester represented by the above general formula (6) may be led to a polyester provided with a biphenyl derivative and an azobenzene derivative bonded with the side chain thereof by mixing an isophthalic acid derivative represented by the aforementioned compound (1) which is a kind of dicarboxylic acid monomer represented by the aforementioned general formula (1), an isophthalic acid derivative represented by the compound (2) containing azobenzene which is a kind of dicarboxylic acid monomer represented by the aforementioned general formula (7) and diols derived from a bisphenol compound represented by the aforementioned general formula (8) in each appropriate amount and by reacting the mixture by the aforementioned high-temperature polycondensation method based on ester exchange. Here, the ratio of the aforementioned two monomers is adjusted corresponding to the design of a medium, whereby the absorbance of the photo-responsive polyester can be controlled.

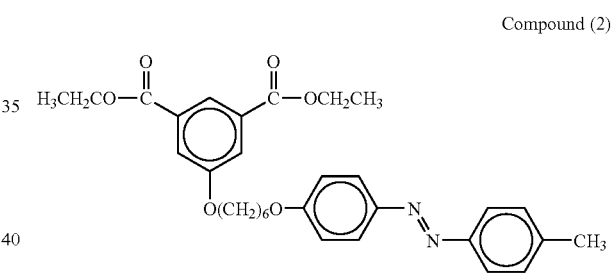

Compound (2)

Here, the absorption coefficient of this photo-responsive polyester may be controlled by adjusting the ratio between the aforementioned two dicarboxylic acid monomers corresponding to the design of a medium. It is desirable to design the ratio x from the viewpoint of the influence of an azoben-

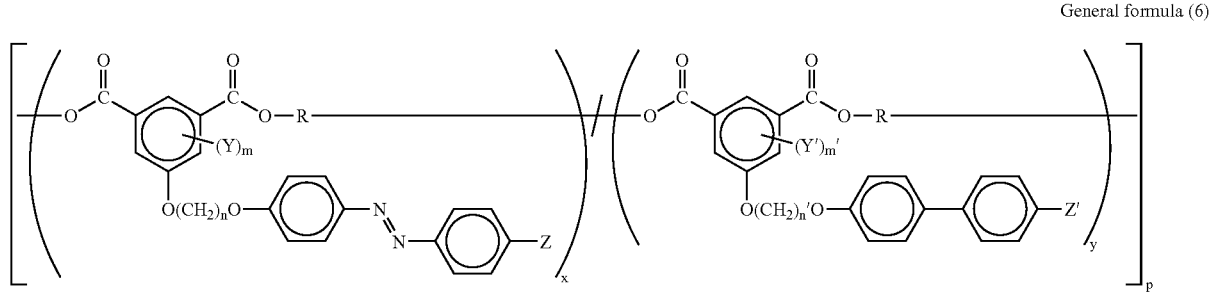

General formula (6)

In the general formula (6), Y and Y', which may be the same or different and are each independently the same as Y in the zene derivative capable of inducing a change in the orientation of a biphenyl derivative and the number of azobenzene units contained in one molecule. Specifically, the ratio x is preferably 0.0005 (1/p) to 0.5 (azobenzene: biphenyl derivative=1:1) and more preferably 0.05 to 0.5.

Next, the polyester represented by the following general formula (10) will be explained. This polyester is also a novel compound and may be used as a photo-responsive polymer.

General formula (10)

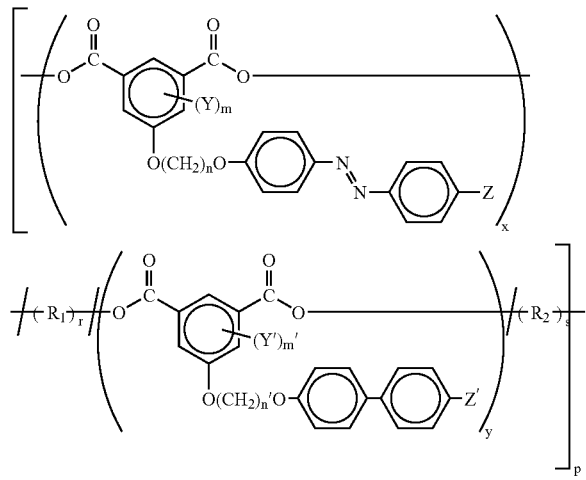

In the general formula (10), $R_1$ represents a structural unit capable of forming a liquid-crystalline or crystalline polymer among R in the general formula (4). Also, $R_2$ represents a structural unit capable of forming an amorphous polymer among R in the general formula (4). The crystallinity of the polymer is defined by the structure of the main chain part. Specifically, the crystallinity of the polymer is dependent on structures of the structural units $R_1$ and $R_2$ and constituting ratio thereof in the main chain. The structural unit capable of forming a liquid-crystalline or crystalline polymer provides a liquid-crystalline or crystalline polymer which is a polymer polymerized using one type of main chain structural unit and exhibits a liquid crystal phase or has a melting point. Examples of this structural unit include 6,6'-(4,4'-carbonyldiphenylenedioxy)dihexanol which is represented by the general formula (8) in which T is a ketone bond and 6,6'-(4,4'-oxydiphenylenedioxy)dihexanol in which T is an ether bond. The aforementioned structural unit capable of forming an amorphous polymer provides an amorphous polymer which is a polymer polymerized using one type of main chain structural unit and has no melting point. Examples of this structural unit include 6,6'-(4,4'-sulfonyldiphenylenedioxy)dihexanol which is represented by the general formula (8) in which T is a sulfone bond.

Y and Y' may be the same or different and are similar with Y in the general formula (4). Z and Z' may be the same or different and are similar with Z in the general formula (4). m and m' may be the same or different and are similar with m in the general formula (4). n and n' may be the same or different and are similar with n in the general formula (4). P represents an integer from 5 to 2000. x, y, r and s represent the abundance ratio of the repeat unit wherein x, y, r and s satisfy the following relations: $0<x\leq1$, $0\leq y<1$, $x+y=1$, $0\leq r\leq1$, $0\leq s\leq1$ and $r+s=1$.

As to the polyester represented by the general formula (10), a derivative of isophthalic acid represented by the compound (1) which is one of dicarboxylic acid monomers represented by the general formula (1), a derivative of isophthalic acid represented by the compound (2) containing azobenzene which is one of dicarboxylic acid monomers represented by the general formula (7) and two types of diols derived from a bisphenol compound represented by the general formula (8) are mixed in an proper ratio and reacted by the high-temperature polycondensation method based on ester exchange, which can be led to the production of a polyester with a biphenyl derivative and an azobenzene derivative bound with the side chain thereof.

Here, the crystallinity of this photo-responsive polyester can be controlled by adjusting the ratio between the structural units of the foregoing two types of main chain parts corresponding to the design of a medium. The ratio r is preferably in a range from 0.2 to 0.95, and more preferably in a range from 0.5 to 0.9, from the viewpoint of recording characteristics and scattering.

Synthetic Example of a Binder Polymer Dicarboxylic Acid Monomer: diethyl 5-{6-[4-(4-cyanophenyl)phenoxy]hexyloxy}isophthalate (1) Synthesis of 4-(6-bromohexyloxy)-4'-cyanobiphenyl 0.2 mol (39 g) of 4-hydroxy-4'-cyanobiphenyl, 2 mol (487.5 g) of 1,6-dibromohexane, 1.45 mol (200 g) of potassium carbonate anhydride and 800 ml of acetone were placed in a 2 l three-neck flask equipped with a mechanical stirrer and the mixture was reacted under reflux for 20 hours by using a water bath. The reaction mixture was cooled to ambient temperature and then undissolved salts were removed by filtration. The resulting reaction solution was concentrated to a volume of about ½ by using a rotary evaporator, to which was then added 500 ml of hexane, followed by heating with stirring. Then, the resulting solution was cooled gradually to ambient temperature and then allowed to stand in a freezing chamber to crystallize. After the crystallized product was subjected to vacuum filtration, it was washed with n-hexane and dried under reduced pressure to obtain a crude target product (yield: 85% (61.3 g)), which was then recrystallized from ethanol to obtain a purified target product 4-(6-bromohexyloxy)-4'-cyanobiphenyl (yield: 58% (41.8 g)).

(2) Synthesis of diethyl 5-hydroxyisophthalate 1 mol (182.4 g) of 5-hydroxyisophthalic acid, 1500 ml of ethanol and 10 ml of concentrated sulfuric acid were placed in a 2 l three-neck flask and the mixture were reacted under reflux for 24 hours by using a water bath. After the reaction was completed, the system was concentrated to a volume of about ½ by using a rotary evaporator. The resulting solution was poured into a cooled aqueous solution containing about 20% of sodium bicarbonate to precipitate a crude target product as a white flock, which was then separated by filtration and dried under reduced pressure (yield: 96% (229 g)). The crude product was recrystallized from ethanol to obtain diethyl 5-hydroxyisophthalate (yield: 80% (190 g)).

(3) Synthesis of (diethyl isophthalate carrying cyanobiphenyl: diethly 5-{6-[4-(4-cyanophenyl)phenoxy]hexyloxy}isophthalate)

0.08 mol (28.8 g) of 4-(6-bromohexyloxy)-4'-cyanobiphenyl, 0.08 mol (16.6 g) of diethyl 5-hydroxyisophthalate, 0.12 mol (19.2 g) of potassium carbonate anhydride and 400 ml of acetone were placed in a 1 l three-neck flask and the mixture was reacted under reflux for 24 hours by using a water bath. After the reaction solution was allowed to cool, it was poured into about 4 l of purified water to take out a precipitate, which was to be a crude subject product, by filtration and the precipitate was dried under reduced pressure (yield: 90% (37 g)). The resulting precipitate was recrystallized from acetone to obtain diethyl isophthalate carrying cyanobiphenyl through a hexyl group as a target product (yield: 73% (30 g)). The resulting compound was subjected to nuclear magnetic resonance (NMR) measurement. The results of measurement are shown below. Also, the compound was subjected to mass spectrometry, with the result that a peak corresponding to a molecular weight of 515.6 was confirmed.

dropping the pressure of the system gradually to 2 Torr over 30 minutes. After the reaction was completed, the reaction solution was dissolved in chloroform and the resulting solution was poured into methanol to taken out a crude polymer. This crude polymer was reprecipitated and then subjected to boiling-washing using hot methanol and then hot water. The

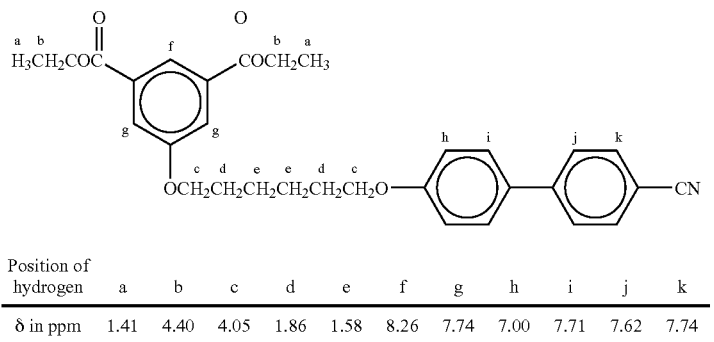

| Position of hydrogen | a | b | c | d | e | f | g | h | i | j | k |
|---|---|---|---|---|---|---|---|---|---|---|---|
| δ in ppm | 1.41 | 4.40 | 4.05 | 1.86 | 1.58 | 8.26 | 7.74 | 7.00 | 7.71 | 7.62 | 7.74 |

Main Chain Monomer: Synthesis of 6,6'-(4,4'-sulfonyldiphenylenedioxy)dihexanol 0.3 mol (82.3 g) of 4,4'-sulfonyldiphenol, 0.66 mol (90.2 g) of 6-chloro-1-hexanol and 0.7 mol (97 g) of potassium carbonate anhydride were weighed and mixed and 250 ml of N,N-dimethylformamide was added to the mixture, followed by stirring to suspend. The system was heated to 160° C. using an oil bath and reacted for 24 hours. After that, the reaction solution was poured into water containing a small amount of hydrochloric acid. The generated white powder material was separated by filtration and dried to obtain a crude target product, which was then recrystallized from a water-N,N-dimethylformamide system to obtain purified 6,6'-(4,4'-sulfonyldiphenylenedioxy)dihexanol (yield: 89% (120 g)). The resulting compound was subjected to measurements of infrared absorption spectrum (IR) and nuclear magnetic resonance (NMR). The results are shown in the following.

IR: 2937 cm$^{-1}$ (CH expansion), 1594 cm$^{-1}$ (C=C), 1252 cm$^{-1}$ (C–O–C) 1149 cm$^{-1}$ (S=O)

precipitate was separated by filtration and dried under reduced pressure to obtain a target polyester (yield: 82% (3.96 g). The resulting polyester was a transparent amorphous polymer having a number average molecular weight of 8244 and a glass transition temperature of 53° C.

Synthesis of a Photo-responsive Polymer Photo-responsive Dicarboxylic Acid Monomer Carrying Methylazobenzene: synthesis of diethyl 5-{6-[4-(4-methylphenylazo)phenoxy]hexyloxy}isophthalate (1) (Synthesis of 4-hydroxy-4'-methylazobenzene)

A 3 l beaker was charged with 750 ml of 6 N hydrochloric acid and then with 107 g (1 mol) of finely pulverized p-anisidine(4-methylaniline). The mixture was sufficiently suspended by stirring and about 300 g of ice was added to the suspension, followed by cooling the system. In the meantime, 80 g (1.16 mol) of sodium nitrite was dissolved in 500 ml of water. 400 ml of the sodium sulfite solution was poured into the suspension over 20 minutes. After completion of the drip-

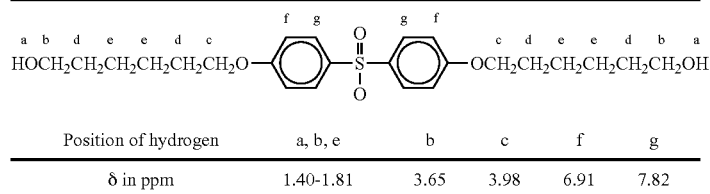

| Position of hydrogen | a, b, e | b | c | f | g |
|---|---|---|---|---|---|
| δ in ppm | 1.40-1.81 | 3.65 | 3.98 | 6.91 | 7.82 |

Binder Polymer (1) for Controlling the Concentration of a Dye: Synthesis of a Polyester Having Cyanobiphenyl at a Side Chain 0.005 mol (2.58 g) of diethyl 5-{6-[4-(4-cyanophenyl)phenoxy]hexyloxy}isophthalate, 0.005 mol (2.25 g) of 6,6'-(4,4'-sulfonyldiphenylenedioxy)dihexanol and 0.05 g of zinc acetate anhydride were taken in a 300 ml three-neck flask equipped with a vacuum device and a stirring device and the mixture was reacted at 160° C. for 2 hours and then for 20 minutes under a vacuum of about 10 Torr with heating and stirring. Next, the temperature was raised to 180° C. with ping, the solution was stirred at about 5° C. for one hour. To the solution was gradually added a solution obtained by dissolving 94 g (1 mol) of phenol in 1 l of a 2N potassium hydroxide solution, followed by mixing and the mixture was reacted overnight. After the reaction was completed, the generated precipitate was separated by filtration and dried under reduced pressure to obtain 210 g (almost quantitative) of crude 4-hydroxy-4'-methylazobenzene. The product was subjected to the next reaction without purifying the same. The maximum absorption wavelength (λmax) of the compound was 345 nm.

(2) Synthesis of (4-(6-bromohexyloxy)-4'-methylazobenzene

A 2 l three-neck flask equipped with a mechanical stirrer was charged with 42.4 g (0.2 mol) of 4-hydroxy-4'-methylazobenzene synthesized in the same manner as in the Example, 448 g (2 mol) of 1,6-dibromohexane and 212 g (1.5 mol) of potassium carbonate anhydride. To the mixture was added 800 ml of acetone and the resulting mixture was suspended by stirring. The reaction system was heated until acetone was refluxed to react hydroxybenzene with bromoalkane. After the reaction was continued for 20 hours, insoluble salts were separated by filtration and removed. The system was concentrated to a volume of about ⅓ by using a rotary evaporator. When the system was cooled in a freezing chamber, 4-(6-bromohexyloxy)-4'-methylazobenzene was produced as a crystal. After the generated product was subjected to filtration, it was washed with a small amount of cool acetone, cool ether and n-hexane in this order and then dried under reduced pressure to obtain 38.1 g of crude 4-(6-bromohexyloxy)-4'-methylazobenzene (yield: 50.8%). The resulting product was recrystallized from ethanol to obtain 32 g (yield: 42%) of 4-(6-bromohexyloxy)-4'-methylazobenzene. It was found from an analysis using high performance liquid chromatography that the purity of the product was 98.6% or more.

(3) Synthesis of diethyl (5-{6-[4-(4-methylphenylazo)phenoxy]hexyloxy}isophthalate A 1 l three-neck flask was charged with 16.6 g (0.07 mol) of diethyl 5-hydroxyisophthalate, 26.1 g (0.07 mol) of 4-(6-bromohexyloxy)-4'-methylazobenzene and 15.1 g (0.11 mol) of potassium carbonate anhydride. To the mixture was added 300 ml of acetone and the system was refluxed under heating to react for 24 hours. After the reaction was completed, the system was poured into 1500 ml of cool water to obtain diethyl {6-[4-(4-methylphenylazo)phenoxy]hexyloxy}isophthalate, which was then separated by filtration and dried under reduced pressure (yield: 83% (35.1 g)). The product was recrystallized from acetone twice to obtain 30.1 g (80.1%) of a target product, diethyl (5-{6-[4-(4-methylphenylazo)phenoxy]hexyloxy}isophthalate. It was found from an analysis using high performance liquid chromatography that the purity of the product was 98.5% or more. The resulting compound was subjected to measurements of infrared absorption spectrum (IR) and nuclear magnetic resonance (NMR). The results are shown in the following.

IR: 2938 cm$^{-1}$ (CH expansion), 1716 cm$^{-1}$ (ester C=O), 1601 cm$^{-1}$ (C=C), 1580 cm$^{-1}$ (N=N), 1246 cm$^{-1}$ (C–O–C)

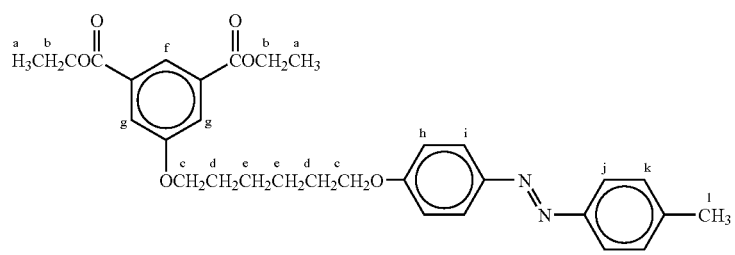

| Position of hydrogen | a | b | c | d | e | f | g | h, k | i, j | l |
|---|---|---|---|---|---|---|---|---|---|---|
| δ in ppm | 1.41 | 4.41 | 4.05 | 1.87 | 1.58 | 8.27 | 7.75 | 6.98-7.01 | 7.85-7.88 | 3.88 |

Photo-responsive Polymer: Synthesis of a Polyester Having cyanobiphenyl and Methylazobenzene at a Side Chains Diethyl (5-{6-[4-(4-cyanophenyl)phenoxy]hexyloxy}isophthalate as a dicarboxylic acid monomer carrying cyanobiphenyl, diethyl 5-{6-[4-(4-methylphenylazo)phenoxy]hexyloxy}isophthalate as a photo-responsive dicarboxylic acid monomer carrying methylazobenzene and 6,6'-(4,4'-sulfonyldiphenylenedioxy)dihexanol as a main chain portion monomer were used to synthesize four types of polymer different in the copolymerization ratio of the dye (methylazobenzene) side chain by using the same method as in the case of the polyester synthesis as mentioned above. The mixing ratios of the materials in each synthesis are found in Table 1. Also, the structure of the synthesized polyester is shown as [Compound 28]. The yield, number average molecular weight and glass transition temperature of each resulting polymer are shown in Table 2. These polymers were transparent amorphous polymers free from scattering.

TABLE 1

| Copolymerization ratio of the dye side chain | Side chain portion monomer carrying cyanobiphenyl | Side chain portion monomer carrying methylazobenzene | Main chain portion monomer | Zinc acetate |
|---|---|---|---|---|
| Polymer 1 (100%: x = 1, y = 0) | 0 g | 2.66 g | 2.25 g | 0.05 g |
| Polymer 2 (50%: x = 0.5, y = 0.5) | 1.29 g | 1.33 g | 2.25 g | 0.05 g |
| Polymer 3 (33%: x = 0.33, y = 0.67) | 1.72 g | 0.89 g | 2.25 g | 0.05 g |
| Polymer 4 (20%: x = 0.2, y = 0.8) | 2.06 g | 0.53 g | 2.25 g | 0.05 g |

TABLE 2

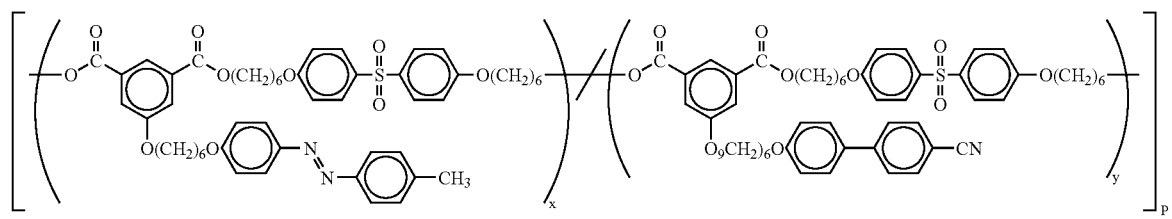

| Copolymerization ratio of the dye side chain | Yield (amount) | Number average molecular weight | Glass transition temperature |
|---|---|---|---|
| Polymer 1 (100%: x = 1, y = 0) | 75.8% (3.73 g) | 8540 | 53° C. |
| Polymer 2 (50%: x = 0.5, y = 0.5) | 82.1% (4.00 g) | 8462 | 53° C. |
| Polymer 3 (33%: x = 0.33, y = 0.67) | 76.0% (3.70 g) | 8561 | 51° C. |
| Polymer 4 (20%: x = 0.2, y = 0.8) | 81.5% (3.95 g) | 7957 | 52° C. |

Photo-responsive Polymer: Synthesis of a Polyester Containing Two Types of Main Chain Structure Parts and Having Cyanobiphenyl and Methylazobenzene as Side Chains Six types of polymers varing in the copolymerization ratio of main chain part monomers are produced in the same manner as in the above example of the synthesis of a polyester by using diethyl 5-{6-[4-(4-cyanophenyl)phenoxy]hexyloxy}isophthalate as a dicarboxylic acid monomer carrying cyanobiphenyl, diethyl 5-{6-[4-(4-methylphenylazo)phenoxy]hexyloxy}isophthalate as a photo-responsive dicarboxylic acid monomer carrying methylazobenzene, 6,6'-(4,4'-sulfonyldiphenylenedioxy)dihexanol as a main chain part monomer and 6,6'-(4,4'-oxydiphenylenedioxy)dihexanol synthesized in the same manner as the above dihexanol. The structural general formula of each synthesized polymer is shown below. The ratio x of the photo-responsive side chain is 0.1, and each ratio r of the main chain part monomer having an ether bond is 0, 0.1, 0.5, 0.8, 0.9 and 1.0.

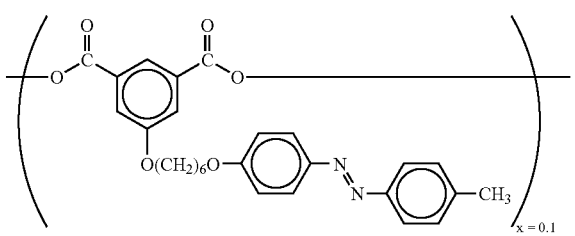

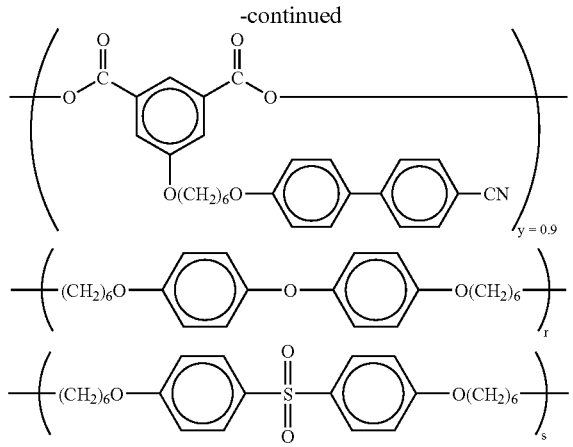

Optical Recording Medium

Structural Materials of the Photosensitive Layer

The optical recording medium of the invention is provided with a photosensitive layer structured of prefixed optical recording materials.

As the optical recording material, a photo-responsive high-molecular compound may be used which is provided with a photo-responsive group to be geometrically isomerized by light radiation and a liquid crystal linear mesogen group, these both groups being bonded therewith as side chains. An introduction of the liquid crystal linear mesogen group, which is not geometrically isomerized, into the compound makes it possible to control the absorbance of a medium and also to reinforce and fix a change in the orientation of the photo-responsive group which change is caused by light radiation.

This therefore ensures that a thick layer can be attained with maintaining good recording sensitivity. Among these compounds, a photo-responsive high-molecular compound which contains an aromatic ring on its main chain and is provided with a photo-responsive group to be geometrically isomerized by light radiation and a liquid crystal linear mesogen group, these both groups being bonded with the aromatic ring as a side chains. In the compound, the side chains are bonded with the aromatic ring fixed to the main chain, rendering it easy to control the crystallinity of the polymer. Accordingly, the layer can be made thick while maintaining high record retentivity.

Additionally, as the optical recording material, a photo-responsive high-molecular compound into which a structural unit capable of forming a liquid-crystalline or crystalline polymer and a structural unit capable of forming an amorphous polymer are introduced into the main chain of the same molecule simultaneously is preferable. Using the compound, continuous crystallinity can be controlled easily by changing the structural ratio of the main chain part thereof. Further, there is a copolymerization ratio to increase photo-induced birefringence with decreasing scattering caused by crystallinity. Therefore, it is possible to attain both a reduction in scattering and an improvement in photo-induced anisotropy, making it possible to maintain higher record retentivity and to attain a thick film at the same time.

Here, as examples of the high-molecular compound containing an aromatic ring on its main chain, polyesters obtained by reacting a dicarboxylic acid such as phthalic acid or isophthalic acid with a diol by polymerization condensation are given. Also, examples of the photo-responsive group which is geometrically isomerized by light radiation include isomerizing groups containing an azobenzene skeleton. Examples of the liquid crystal linear mesogen group include mesogen groups containing a biphenyl skeleton and having a geometrically bar-like form.

As the photo-responsive polymer having controlled dye concentration, photo-responsive polyesters (copolymers) obtained by copolymerizing, for example, a dicarboxylic acid monomer having a biphenyl skeleton and a dicarboxylic acid monomer having an azobenzene skeleton and represented by the aforementioned general formula (6) may be preferably used.

Also, as the optical recording material, a photo-responsive high-molecular composition may be used which comprises a photo-responsive high-molecular compound provided with a photo-responsive group which is geometrically isomerized by light radiation and bonded therewith as a side chain and a photo-unresponsive high-molecular compound provided with a liquid crystal linear mesogen group bonded therewith as a side chain. The absorption amount of a composition can also be controlled by blending a photo-unresponsive high-molecular compound having a liquid crystal linear mesogen group which is not geometrically isomerized as a binder polymer with a polymer containing a low molecular dye or an azobenzene derivative as a structural part. Also, the composition can reinforce and fix a change in the orientation of the photo-responsive group which change is caused by light radiation.

Also, a photo-responsive high-molecular composition may be used, the composition comprising a photo-responsive high-molecular compound which contains an aromatic ring on its main chain and is provided with a photo-responsive group which is geometrically isomerized by light radiation and bonded with the aromatic ring as a side chain and a photo-unresponsive high-molecular compound which contains an aromatic ring on its main chain and is provided with a liquid crystal linear mesogen group bonded with the aromatic ring as a side chain. In the high-molecular compound contained in the composition, the side chain is bonded with the aromatic ring fixed to the main chain and it is therefore easy to control the crystallinity of the polymer. Accordingly, the layer can be made thick while maintaining high record retentivity.

The crystallinity of the respective high-molecular compounds can be controlled more easily by introducing a structural unit capable of forming a liquid-crystalline or crystalline polymer and a structural unit capable of forming an amorphous polymer simultaneously into the main chain of the same molecule, making it possible to attain a reduction in scattering and promotion of a change in the orientation of a photo-responsive group at the same time.

For example, a polyester represented by the general formula (4) is preferable as the binder polymer. It is also possible to control the concentration of a dye by blending a polyester represented by the general formula (4) with a photo-responsive polyester represented by the general formula (6).

It is also possible to add additives such as phthalates to the aforementioned optical recording material with the intention of improving filming characteristics and adhesion to a substrate.

Structure of the Optical Recording Medium

The optical recording medium of the invention may be constituted of a substrate and a photosensitive layer comprising the aforementioned optical recording material or may be constituted only of the aforementioned optical recording material provided that the whole of the optical recording medium is formed as the photosensitive layer. No particular limitation is imposed on a material used for the substrate as far as it is transparent and firm in the range of wavelengths to be used and is not significantly changed in qualities and dimension in a usual temperature and humidity range. Examples of the material used for the substrate include soda glass, boro-silicated glass, potash glass, acryl plates, polycarbonate and polyethylene terephthalate (PET) sheets.

The optical recording medium of the invention allows the photosensitive layer to be made thick by using the aforementioned optical recording material, though the thickening of the photosensitive layer has been difficult. The thickness of the photosensitive layer can be varied within a range from 10 μm to 10000 μm without impairing optical recording characteristics. With an increase in thickness, the multiplicity of recording can be more raised. However, the diffraction efficiency of a multiplexed hologram decreases in inverse proportion to almost the square of the multiplicity and it is therefore preferable that the thickness of the photosensitive layer be within the range where several thousands multiples are allowed, namely the range from 50 μm to 1000 μm.

The optical recording medium of the invention may be formed into a two-dimensional or three-dimensional shape such as a sheet form, tape form, film form and disk form. As to specific methods, the optical recording material is dissolved in an aliphatic or aromatic halogen type solvent or an ether type solvent such as chloroform, methylene chloride, o-dichlorobenzene, tetrahydrofuran, anisole and acetophenone and the resulting solution is applied to a substrate such as glass, whereby a transparent and tough film-like optical recording medium can be formed. Also, the optical recording medium can also be formed in the form of a film by compressing a powdery, pellet or flake solid of the optical recording material by means of a hot press method or the like.

Preferable examples of the form of the optical recording media of the invention include the following optical recording media (1) to (5): (1) optical recording media which have a disk form and are rotated with moving a record reproducing head along the radius vector thereon to scan, whereby recording and reproduction can be carried out; (2) optical recording media which have a sheet form and on which a record reproducing head is moved in a two-dimensional direction to scan, whereby recording and reproduction can be carried out; (3) optical recording media which have a tape form, on a fixed part of which a record reproducing head is moved with rolling it to scan, whereby recording and reproduction can be carried out; (4) optical recording media which have a three-dimensional bulk form and are fixed to a fixed or movable stage and the surface or inside of which is scanned by a movable or fixed record reproducing head, whereby recording and reproduction can be carried out; and (5) optical recording media which have a two-dimensional form such as a disk form, sheet form or card form or other three-dimensional forms obtained by laminating film-like media appropriately and which are scanned by a record reproducing head by using each of the methods described in (1) to (4), whereby recording and reproduction can be carried out.

Applicable Recording Method

The optical recording medium of the invention is used for optical recording utilizing a change in the absorption, refractive index or shape of an optical recording material which change is associated with application of light or heat to the optical recording material. Examples of optical recording methods include hologram recording, light absorbance modulation recording, light reflectance modulation recording and photo-induced relief formation. Among these methods, hologram recording is a preferable optical recording method suitable for the optical recording medium of the invention. The optical recording medium of the invention enables independent recording in the case where the direction of polarization of incident object light and the direction of polarization of reference light are parallel to each other and in the case where these both directions are perpendicular to each other. The arrangement of the polarization of two light waves when recording a hologram is not limited to these cases and an optional one can be selected as far as it is an arrangement by which the distribution of light intensity due to interference or the distribution of polarization is formed.

Production of an Optical Recording Medium

Optical recording media are produced using 13 types of optical recording materials. 4 types of the optical recording materials were photo-responsive polymers 1 to 4 shown in Tables 1 and 2. 3 types of the optical recording materials were blend polymers obtained by blending polymers 1 prepared so that the contents of methylazobenzene are the same as those of the polymers 2 to 4 with the aforementioned binder polymer (1) shown in the synthetic example. And 6 types of the optical recording materials were photo-responsive polymers obtained by introducing two different structural parts into the main chain part and by changing the ratio between these structural parts according to the following two methods.

(1) Spin Coat Film

Each polymer as an optical recording material was dissolved in a ratio of 0.1 g/ml in chloroform and each solution was applied to a cleaned glass substrate by spin coating in the condition of 1000 rpm and 10 sec to form 13 types of thin films. After dried, the film thickness of each film was measured by a tracer type surface roughness tester, to find that it was a thin film 1 to 1.5 μm in thickness. Each film had a uniform surface and transparent amorphous films free from scattering were obtained except for some films using 6,6'-(4, 4'-oxydiphenylenedioxy)dihexanol as the main chain part monomer. Films in which scattering was found was made into transparent amorphous films by heating and quenching treatment.

(2) Sandwich Type Glass Cell Medium

A flake-form polymer was put on a cleaned glass substrate and a glass substrate was further put on the polymer. The glass substrates were heat-pressed under reduced pressure to produce a sandwich type glass cell medium having a structure in which an optical recording material was sandwiched between two glass substrates.

As to each of the above 4 types of photo-responsive polymers obtained as the polymers 1 to 4 shown in Tables 1 and 2 and the above 3 types of polymer blends obtained by blending polymers 1 prepared such that the contents of methylazobenzene were the same as those of the polymers 2 to 4 with the aforementioned binder polymer (1) shown in the synthetic example, 4 types of cell media differing in the film thickness of the optical recording material layer, specifically cell media in which the thicknesses of the optical recording material layers were 50 μm, 100 μm, 180 μm and 500 μm were produced. The film thickness was controlled using a spacer having the same thickness of the film thickness. The cell media produced in this manner was transparent and uniform films free from scattering and air bubbles.

Also, as to each of the above 6 types of photo-responsive polymers obtained by introducing two different structural parts into the main chain part and by changing the copolymerization ratio between these structural parts, a cell medium in which the thickness of the optical recording material layer was 250 μm was produced. In the case of media in which the ratio of the principal part monomer, 6,6'-(4,4'-oxydiphenylenedioxy)dihexanol was high, a reduction in transparency caused by scattering was confirmed visually.

FIG. 1 shows the absorption coefficient of the thin film obtained from each of the 4 types photo-responsive polymers of the polymers 1 to 4 at a wavelength of 515 nm. It is found from FIG. 1 that the absorption coefficient a of each polymer can be controlled by changing the copolymerization ratio y of the monomers carried on the side chain of cyanobiphenyl. In short, the absorption coefficient α is more decreased with increased copolymerization ratio y.

Figure 2:
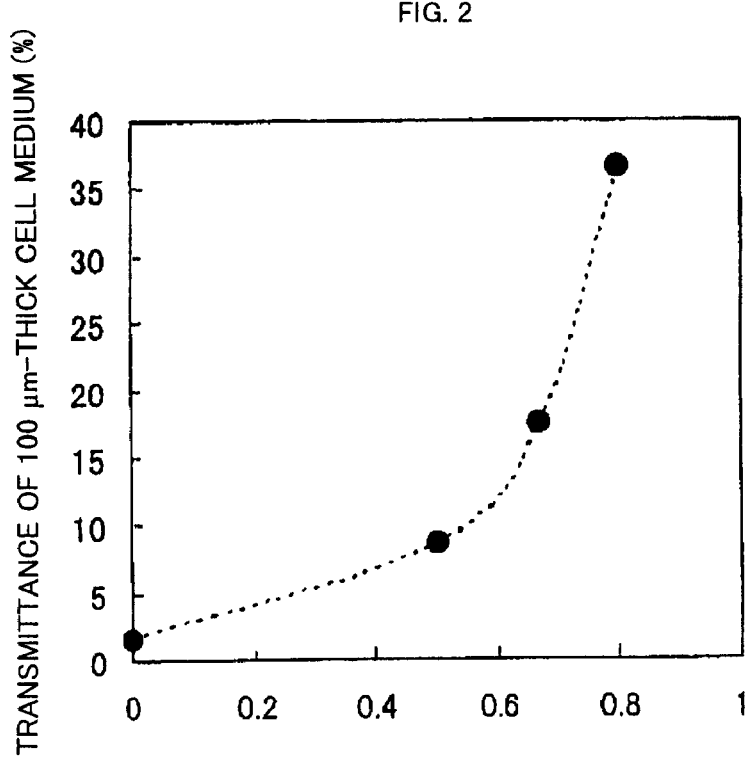
FIG. 2 is a diagram showing a change in the transmittance of an optical recording medium using a photo-responsive polyester carrying a biphenyl derivative for light with a wavelength of 515 nm as a function of the copolymerization ratio of a side chain of a biphenyl derivative in the invention.

Also, FIG. 2 shows the transmittance of the 100-μm-thick cell medium obtained from each of these photo-responsive polymers at a wavelength of 515 nm. As shown in FIG. 2, the transmittance of a thick film medium can be increased by raising the copolymerization ratio y of the monomers carried on the side chain of cyanobiphenyl. Particularly, when the copolymerization ratio y is 0.6 or more, the transmittance of the thick film medium is greatly increased.

Optical Anisotropy (Birefringence) Recording by Irradiation with Polarized Light Next, an example in which using the optical recording medium of the invention, linearly polarized light is applied to carry out birefringence recording will be explained. The optical system used is shown in FIG. 3.

Figure 3:
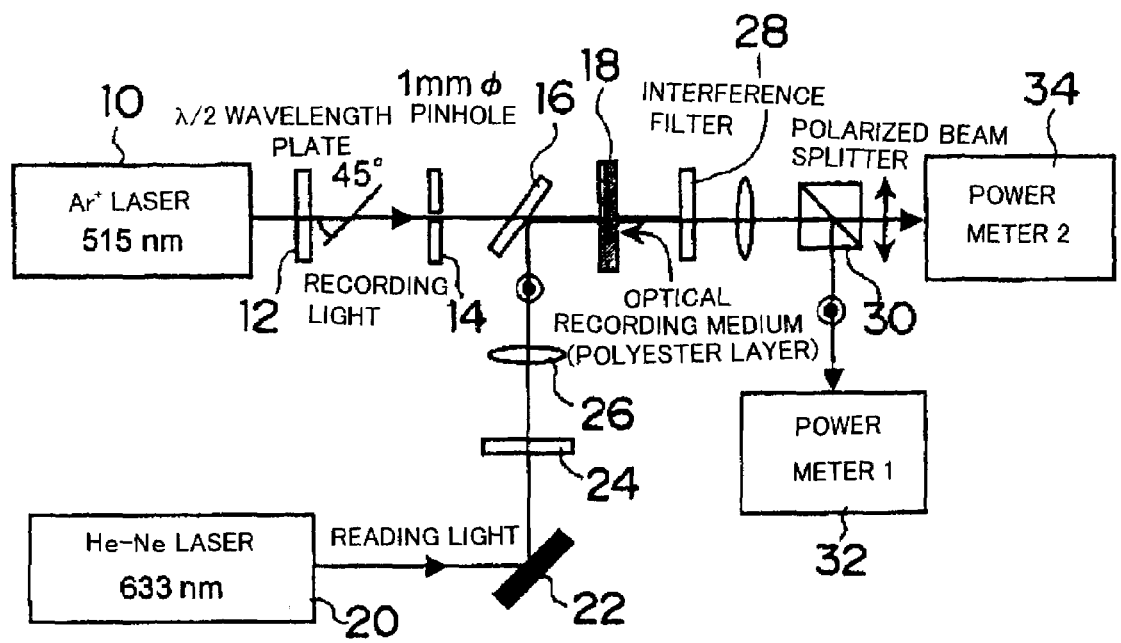
FIG. 3 is a schematic view showing the structure of an optical system which records optical anisotropy.

As shown in FIG. 3, linearly polarized light (7.9 mW) with a wavelength of 515 nm which is sensitive to a polymer constituting an optical recording medium 18 was made to be incident on the polymer as recording light from an argon ion laser 10 through a ½ wavelength plate 12, a pinhole 14 and a half mirror 16. Also, linearly polarized light with a wavelength of 633 nm was made to be incident at an angle of 45° C. to the axis of the polarized light as pumping light from a He—Ne laser 20 through a mirror 22, a ½ wavelength plate 24, a lens 26 and a half mirror 16. The laser light penetrating the optical recording medium 18 passes through an interference filter 28 and is divided into polarized light components traveling in polarized directions perpendicular to each other by a polarizing beam splitter 30. The light out put of each polarized light component were measured by two power meters 32 and 34 respectively. A change in birefringence was calculated from the condition of polarization of the transmitted light by using the values measured by the two power meters 32 and 34.

A spin-coated layer of each of the aforementioned thirteen types of polymer was used as an optical recording medium to carry out birefringence recording and as a result, it was confirmed that in all media, birefringence was induced and stored. Accordingly, the optical recording medium of the invention can be used for the recording and reproduction of optical anisotropy by irradiation with polarized light.

Here, to confirm the effect obtained by introducing the dicarboxylic monomer carrying a biphenyl derivative according to the invention, a spin-coated layer made of a blend material comprising the aforementioned polymer 1 having methylazobenzene at a side chain and the binder polymer (1) having cyanobiphenyl at a side chain was compared in photo-induced anisotropy with a spin-coated layer made of a blend material comprising the above polymer 1 and a binder polymer having no side chain. The binder polymer having no side chain was synthesized using diethyl isophthalate as a monomer. The contents of the polymer 1 in both spin-coated films were made to be equal to each other.

Figure 4:
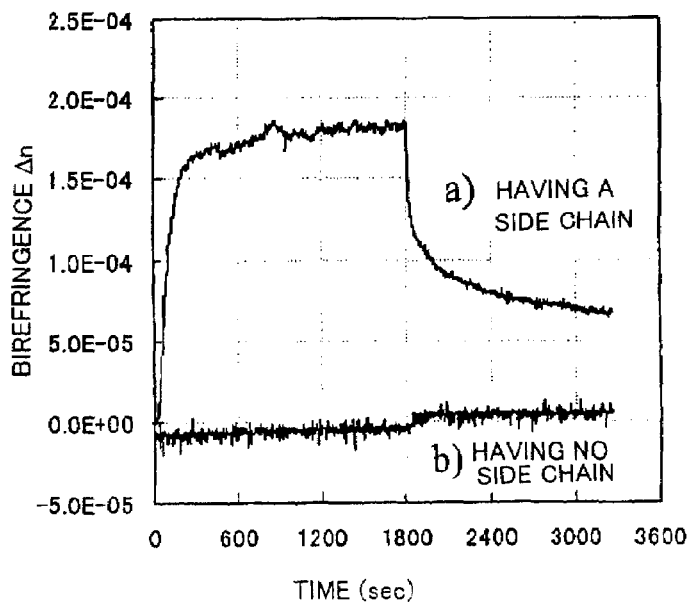
FIG. 4 is a diagram for explaining the effect of a biphenyl derivative in a binder polymer according to the invention.

FIG. 4 shows the condition of a change with time as to a change of birefringence Δn. Here, a medium was exposed in the condition of 1 W/cm² and 1800 sec to carry out birefringence recording. In the medium using the binder polymer (1) according to the invention, birefringence is induced once polarized light was applied and a change in the birefringence was stored after the polarized light was shut out. In the medium using a binder polymer having no side chain, on the other hand, birefringence could be neither induced nor stored.

The difference directly reflects the effect obtained by introducing dicarboxylic acid monomer carrying a biphenyl derivative in the invention. Namely, it is considered that the cyanobiphenyl group bonded with the side chain of the binder polymer (1) appropriately restricts the mobility of methylazobenzene to thereby contribute to the retention of records caused by a change in the orientation of methylazobenzene. As aforementioned, the introduction of the dicarboxylic acid monomer carrying a biphenyl derivative into the layer makes it possible to control the concentration of a dye in the thin layer and also to retain optical recording characteristics based on a change in the orientation of azobenzene.

Further, in order to confirm the effect of controlling crystallinity in the high-molecular compound according to the invention, a spin coat film is produced using 6 types of photo-responsive polymers differing in the copolymerization ratio of the main chain part, to record photo-induced birefringence. Each copolymerization ratio r of the main chain monomer having an ether bond is 0, 0.1, 0.5, 0.8, 0.9 and 1.0. The condition of a change in birefringence Δn with time with respect to copolymerization ratio is shown. When measuring the change in birefringence Δn, exposure is carried out in the condition of 2 W/cm² and 900 sec to record birefringence. Also, in FIG. 12, the recorded birefringence and the transmittance measured using a cell medium provided with a light-sensitive layer having a thickness of 250 μm are plotted against copolymerization ratio. The transmittance is measured using 633 nm He—Ne laser light.

Figure 11:
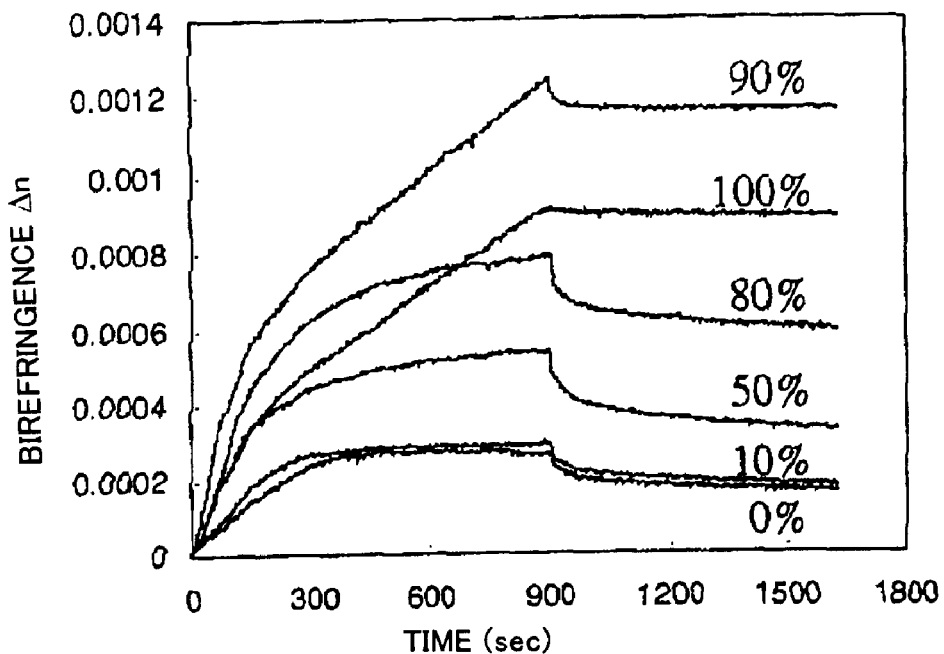
FIG. 11 is a diagram showing the condition of a change in birefringence Δn with time with respect to the copolymerization ratio of the main chain-consisting monomer having an ether bond.
Figure 12:
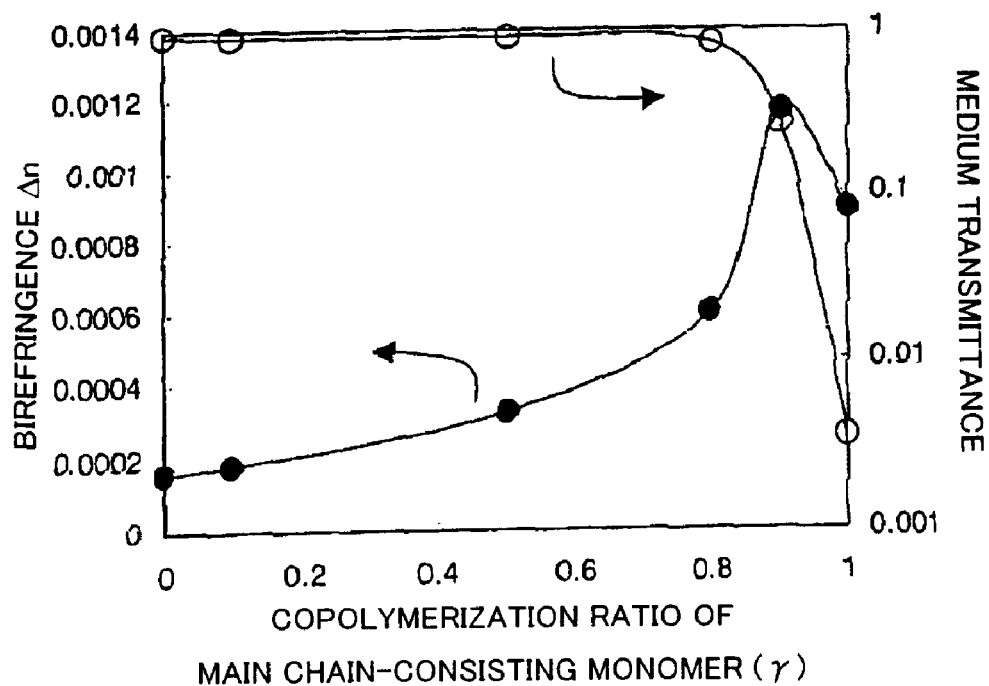
FIG. 12 is a diagram showing the condition of a change in birefringence Δn and a change in medium transmittance with respect to the copolymerization ratio of the main chain-consisting monomer having an ether bond.

Firstly, explanations will be furnished as to the control of crystallinity by a difference in the structure of the main chain part on the basis of the results of measurement made when the copolymerization ratios of the main chain part is 0 and 1.0. When the ratio is 0, namely the structure of the main chain part having a sulfone bond gives an amorphous polymer having no melting point. As shown in FIG. 11 and 12, this polymer brings about high medium transmittance because it can form a thick film free from scattering though recordable birefringence is relatively low. On the other hand, when the ratio is 1.0, namely the structure of the main chain part having a ether bond forms a crystalline polymer. In the case of a medium having a film thickness of 250 μm, the transmittance is dropped even to 0.36% because of large scattering caused by crystallinity. However, recordable birefringence is larger than that of an amorphous polymer, there is no relaxation after recording light is cut off and the medium exhibits high record retentivity. As aforementioned, the high molecular compound in the invention has a structure in which the side chain is bound with an aromatic ring fixed to the main chain and it is therefore possible to control the crystallinity of the polymer by using different main chain part monomers.

Next, explanations will be furnished as to the control of crystallinity by the copolymerization ratio of the main chain part. It is possible to suppress a reduction in transmittance caused by scattering and to increase the recorded birefringence continuously by increasing the ratio of the monomer having an ether bond forming a crystalline polymer as shown in FIG. 12. Furthermore, it is amazing that in the case of a polymer in which the copolymerization ratio of the main chain having an ether bond is designed to be 0.9, a reduction in transmittance caused by the scattering of a crystalline polymer having a copolymerization ratio of 1.0 can be remarkably improved and also recordable birefringence can be increased. As shown in FIG. 11, the increase in recorded birefringence also directly contributes to an improvement in recording sensitivity. FIG. 13 shows diffraction efficiency with respect to exposure energy when carrying out hologram recording according to the recording method which will be explained later. The results of a medium (film thickness: 250 μm) using a polymer in which the copolymerization ratio of the main chain having an ether bond is 0.9 and which exhibited the highest sensitivity in the recording of birefringence are shown in comparison with those of a medium using an amorphous polymer in which the copolymerization ratio of the main chain is 0. Exposure energy reaching the maximum value can be reduced to about ⅙ in the condition that the maximum diffraction efficiency is maintained and it is understood that the invention enables a thick film medium to be highly sensitized. As aforementioned, a thick film medium having the characteristics that its crystallinity can be easily controlled by changing the copolymerization ratio of the main chain part, and it has low scattering and high record retentivity and is also superior in recording sensitivity can be produced.

Hologram Recording

Next, an example in which hologram recording was carried out using the optical recording medium of the invention will be explained. The optical system used is shown in FIG. 5.

Figure 5:
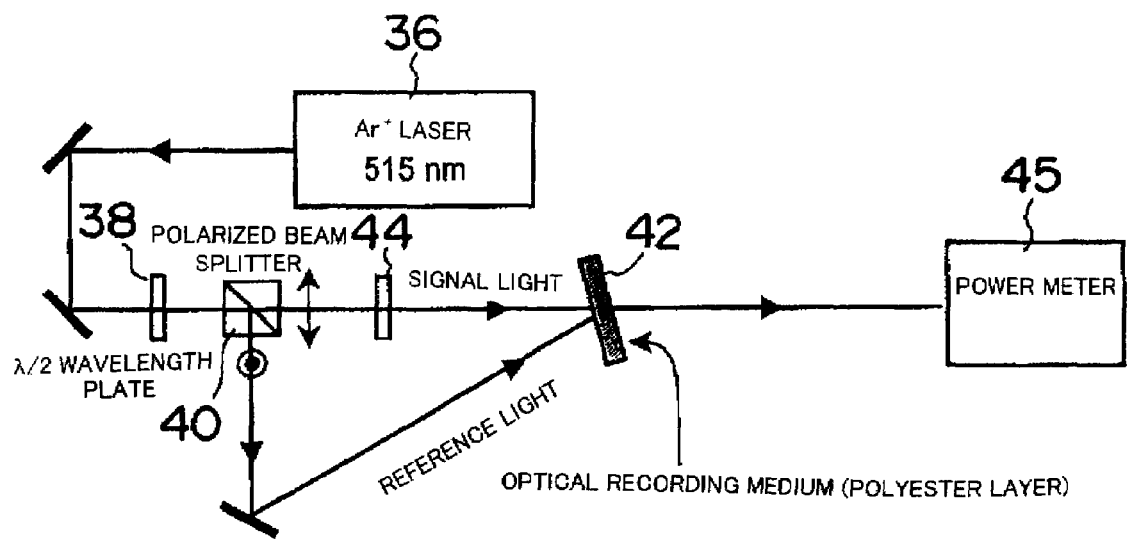
FIG. 5 is a schematic view showing the structure of an optical system recording a hologram.

As shown in FIG. 5, a 515 nm oscillation line of an argon ion laser 36 was used for recording and reproduction. The linearly polarized light emitted from the laser 36 is rotated as to polarization by a ½ wavelength plate 38 and is then divided into two light waves, namely, signal light and reference light by a polarizing beam splitter 40. At this time, a balance in intensity between the two light waves can be adjusted by controlling the angle of rotation of polarization. In the structure of the invention, these two light waves intersect with each other in an optical recording medium 42 and induces optical anisotropy in the medium corresponding to the distribution of intensity due to the interference of the two light waves or the distribution of polarization. A ½ wavelength plate 44 disposed in a signal light optical path controls the polarization of the signal light, whereby an intensity modulation hologram in which the directions of polarization of the signal light and reference light are parallel to each other or a polarization modulation hologram in which the directions of polarization of the both are perpendicular to each other can be recorded. When reproducing a hologram, diffracted light of the recorded hologram is obtained by applying only the reference light to the optical recording medium 42 and the light output can be measured by a power meter 45. The diffraction efficiency of the optical recording medium was calculated by finding the ratio of the intensity of the diffracted light to the light intensity of the reference light.

Figure 6:
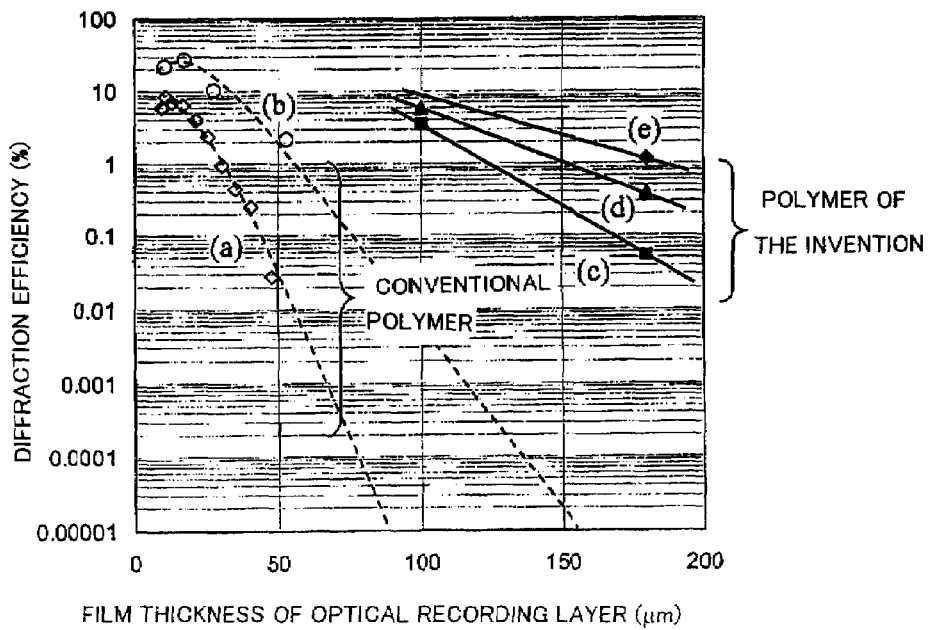
FIG. 6 is a diagram for comparing the diffraction efficiency of an optical recording medium according to the invention using an optical recording material according to the invention with that of an optical recording medium of prior art technologies.

FIG. 6 is a chart in which the diffraction efficiency of the optical recording medium using the photo-responsive polymer of the invention is plotted against the layer thickness of a photosensitive layer (shown as an "optical recording layer" in FIG. 6) as compared with an optical recording medium using a conventional polymer. Here, the obtained diffraction efficiency is effected by the polarization hologram recorded when signal light and reference light are respectively the light polarized in a direction horizontal to the space and when the both lights are respectively the light polarized in a direction perpendicular to the space.

In the figure, (a) corresponds to a polyester having cyanobenzene at a side chain. It is to be noted that there is a description concerning a polyester having cyanobenzene at a side chain in (MINABE Jiro et al., "*Holographic Recording and Reconstruction of Polarized light with Azopolymer (II)*", the 59th Meeting, Japan Society of Applied Physics, Preprints, p. 1015 (1998)). Also, in the figure, (b) shows the results concerning a polyester having methylazobenzene at a side chain as disclosed in JP-A No. 2000-109719. It is found that the both are decreased rapidly in diffraction efficiency with an increase in layer thickness.

On the other hand, (c), (d) and (e) in the figure relate to the photo-responsive polymer of the invention and correspond to the aforementioned polymer 2, polymer 3 and polymer 4 respectively. As this result shows, the optical recording medium of the invention can give a diffraction efficiency more than 100 times that of an optical recording medium according to prior art technologies when the layer thickness is 100 μm and more than 10000 times that of an optical recording medium according to prior art technologies when the layer thickness is 150 μm. These effects are considered to be obtained by the reasons that the absorption loss of the medium is decreased and the scattering is decreased by increased amorphousness.

Figure 7:
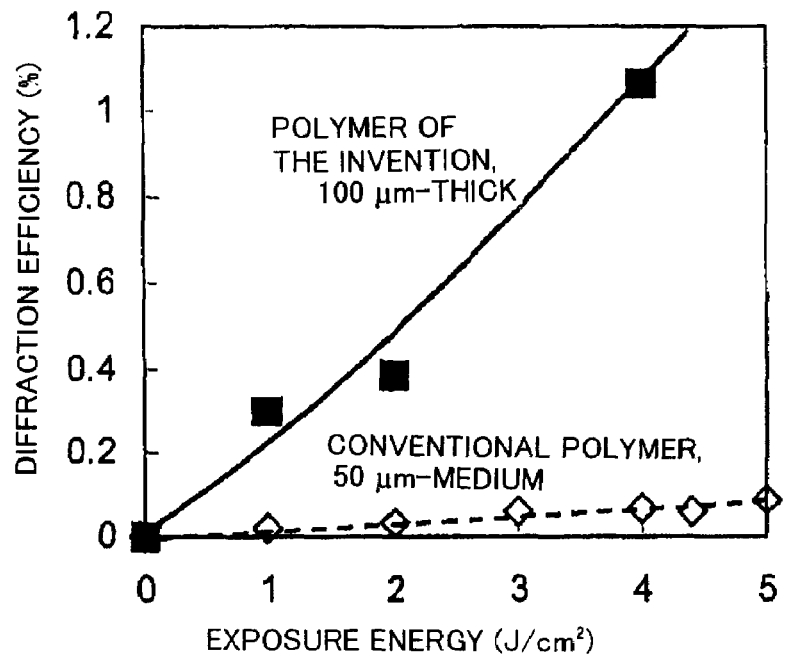
FIG. 7 is a diagram for comparing the sensitivity of an optical recording medium according to the invention using an optical recording material according to the invention with that of an optical recording medium of prior art technologies.

Also, FIG. 7 shows the relationship between a change in diffraction efficiency and exposure time in the case of a 100-μm-thick optical recording medium using the polymer 2 according to the invention and in the case of a 50-μm-thick optical recording medium using a conventional polymer (polyester having cyanobenzene at a side chain). Namely, exposure energy increases in proportion to exposure time. It is found that an optical recording medium using the photo-responsive polymer of the invention has a higher thickness and sensitivity than an optical recording media according to prior art technologies. The use of the photo-responsive polymer of the invention ensures that high diffraction efficiency can be attained and the sensitivity of an optical recording medium can be improved even if layer thickness is increased.

Figure 8:
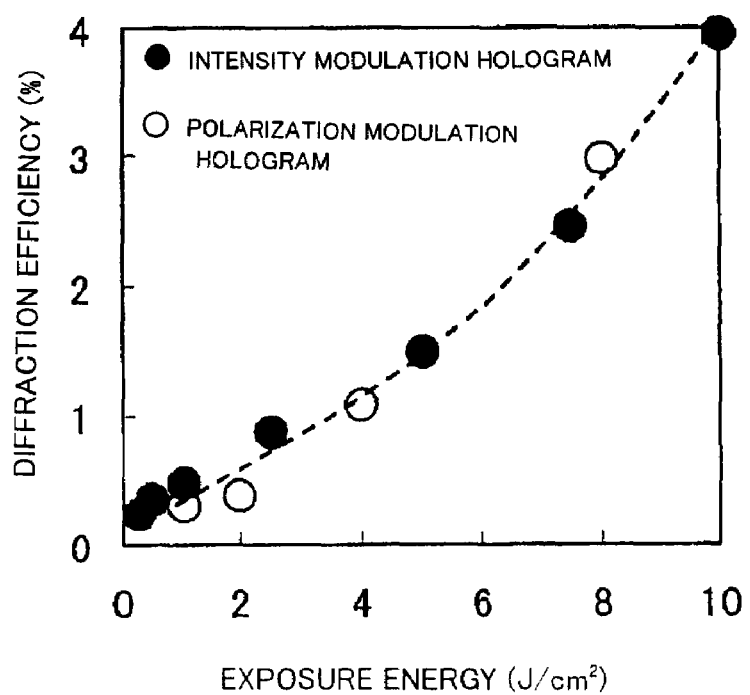
FIG. 8 is a diagram showing a change in the diffraction efficiency of an intensity modulation or polarization modulation hologram in an optical recording medium according to the invention using an optical recording material according to the invention.

FIG. 8 shows the relation between a change in diffraction efficiency and exposure energy in the behavior of the intensity modulation hologram and polarization modulation hologram recorded in a 100-μm-thick optical recording medium using the polymer 2 according to the invention. The optical recording medium of the invention can record both types of hologram. In the polarization holograms recorded by horizontal polarization and vertical polarization, the direction of polarization of reference light is rotated at 90° when the hologram is reproduced. Accordingly, when these both types of hologram are multiple-exposed in the same volume and then read out by the same reference light, the both holograms can be independently reproduced by a polarizing beam splitter and a polarizing plate because the polarizations of the diffracted lights of the both are different by 90° from each other.

In this manner, the optical recording medium using the photo-responsive polymer of the invention enables polarization multiple recording. Also, as shown in FIG. 8, the diffraction efficiencies of the both of the intensity modulation hologram and the polarization modulation hologram are almost the same. The utilization of the characteristics makes it possible to use the optical recording medium of the invention as an optical recording medium enabling polarization recording. Namely, the optical recording medium of the invention may be utilized in methods as described in JP-A No. 10-340479, in a recording and reproduction method in which information is encoded as the distribution of polarization and as a vector holographic memory medium enabling optical calculation of polarization multiple recorded data pages.

Digital Holographic Memory

Figure 9:
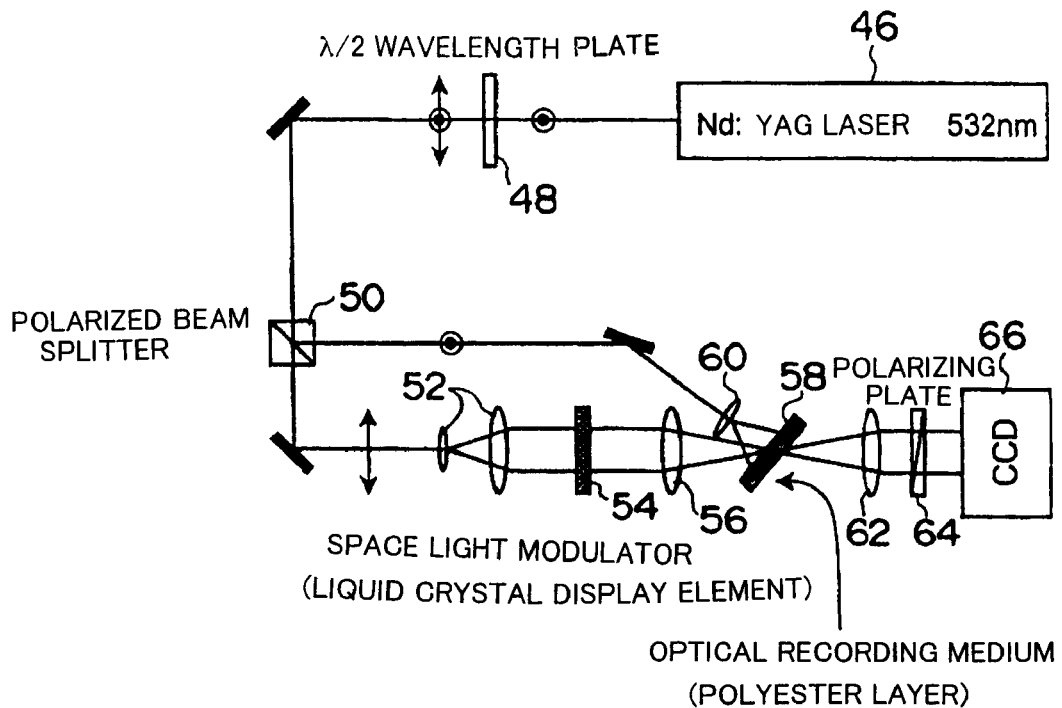
FIG. 9 is a schematic view showing the structure of an optical system which materializes a digital holographic memory.

Next, an example in which the optical recording medium using the photo-responsive polymer according to the invention is applied to a digital holographic memory will be explained. The memory system used is shown in FIG. 9.

The memory system has the following structure. Namely, an oscillation line with a wavelength of 532 nm from a solid laser 46 excited by a laser diode was used to record. The laser beam emitted from the solid laser 46 is incident on a polarizing beam splitter 50 through a ½ wavelength plate 48 where it is divided into two light waves, namely signal light and reference light. The signal light is expanded and collimated by a lens system 52 and passed through a spatial light modulator 54. At this time, data encoded corresponding to information is expressed by light and shade on a liquid crystal display which is the spatial light modulator 54 and imparted to the signal light. In succession, the signal light is processed by Fourier transformation using a lens 56 and then applied to the optical recording medium 58. On the other hand, the reference light is changed to a sphere wave by a lens 60 disposed just before the optical recording medium 58 and applied to the optical recording medium 58 such that it is superimposed on the signal light in the optical recording medium 58.

An interference fringe or a polarization distribution is formed in the optical recording medium 58 by the signal light and the reference light. In response to this, optical anisotropy is induced and a hologram is recorded. When reproducing the hologram, the light diffracted by the spherical wave is processed by Fourier transformation using a lens 62 and a desired polarized angle component is selected by a polarizing plate 64 to form an image on a CCD camera 66. The distribution of intensity reproduced by the CCD camera 66 is binary-coded by a proper threshold value and then decoded by a proper means, whereby the recorded information is reproduced.

A digital data was recorded and reproduced using a 100-μm-thick glass cell type optical recording medium using the polymer 2 according to the invention. Setting 160×120 pixels as one page, 19.2 kbits text data was recorded and reproduced together. The reproduced two-dimensional digital data was binary-coded using a proper threshold value and decoded, whereby the text data could be reproduced without any error. Here, although in the example, binary digital data was recorded and reproduced using the distribution of intensity of a signal light, the encoding method is not limited to this, but multilevel digital data using the distribution of intensity may be used. Also, in the optical recording medium of the invention, the direction of polarization of signal light can be recorded. Accordingly, the data may be expresses by the binary or multilevel distribution of polarization direction.

Also, the reason why spherical reference wave is used in the example is that it is intended to attain volume multiple recording by using a simple method. It is previously mentioned that in the case of a thick hologram, volume multiple recording is possible by utilizing hologram selectivity based on the angle of incidence of reference light. That spherical reference wave is used to record and the recorded medium is moved in a horizontal direction corresponds to the fact that the angle of incidence of the reference light on the effectively recorded hologram is made to be changed. Accordingly, by recording with shifting the medium in the condition that optical paths of the signal light and reference light are fixed, volume multiple recording can be attained with ease.

Figure 10:
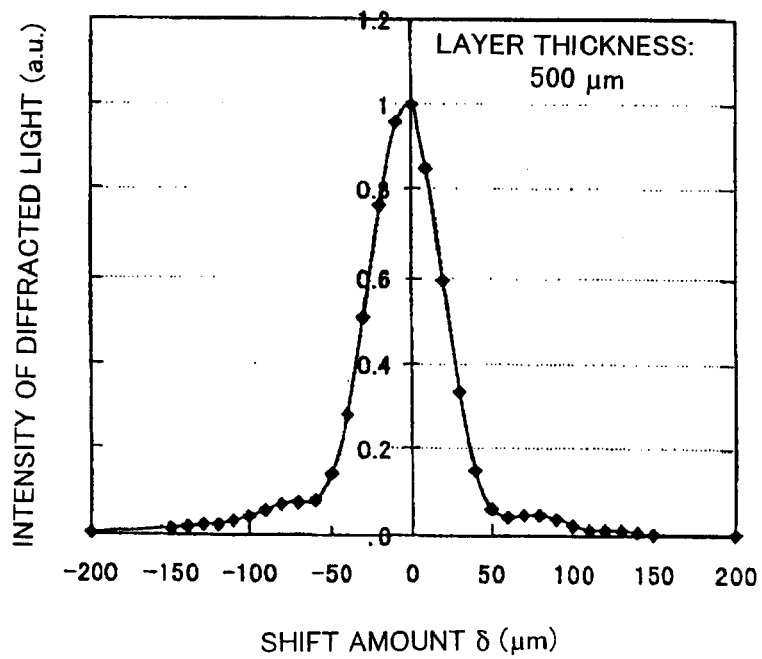
FIG. 10 is a diagram showing the medium shift selectivity of diffraction light in a spherical reference wave shift multiple system using an optical recording medium according to the invention using an optical recording material according to the invention.

FIG. 10 shows the medium shift selectivity of a recorded hologram. A 500 μm-thick glass cell medium obtained using a material prepared by blending the polymer 2 according to the invention with the binder polymer according to the invention in a ratio of 2:9 was used. It was found that the hologram recorded by spherical reference wave was made to disappear by shifting the medium by a distance of 50 μm. From the value, the effective thickness of the recorded hologram was calculated, to find that it almost accorded to the layer thickness of the photosensitive layer. This shows that an effective hologram is formed in all the direction of the thickness of the photosensitive layer.

Also, from experimental results, a multiplexed hologram can be reproduced without any crosstalk by moving the medium by a distance of 100 μm to record the next hologram. A recording region corresponding to one page of the example has a diameter of about 10 mm. 100 multiples can be attained by recording a hologram by moving at intervals of 100 μm. Here, although a spherical reference wave shift multiplexing is used, the multiplexing is not limited to this. The optical recording medium may be applied to a phase multiplexing provided with a phase distribution and a correlation multiplexing. Also, because the optical recording medium of the invention can record the direction of polarization of signal light, a polarization angle multiplexing can be attained.

As explained above, the optical recording material of the invention decreases dye concentration to thereby reduce absorption loss by introducing the "liquid crystal linear mesogen group", such as a biphenyl derivative, which is not geometrically isomerized, whereby information can be recorded extensively in the direction of the layer thickness even if it is made thick. At the same time, the "liquid crystal linear mesogen group" can reinforce and fix a change in the orientation of the "photo-responsive group which is geometrically isomerized by light radiation" such as azobenzene due to its orientation characteristics. Accordingly, it is possible to maintain high recording sensitivity and high diffraction efficiency even if the optical recording material is made thick.

Also, in the case where a side chain is bonded with the "aromatic ring", such as an isophthalic acid derivative, which is fixed to a main chain, the presence the "aromatic ring" at the bonded part restricts the mobility of the side chain and it is therefore difficult for the medium to take a liquid crystal phase. Accordingly, it is possible to control its crystallinity from a liquid crystal state to an amorphous state corresponding to the structure of the main chain. Namely, the degree of freedom for material designing is large. Accordingly, it is possible to control crystallinity to prevent the generation of noises, to thereby maintain high record retentivity even if the thickness of the optical recording material is increased.

Moreover, crystallinity can be continuously controlled easily by introducing a structural unit capable of forming a liquid-crystalline or crystalline polymer and a structural unit capable of forming an amorphous polymer simultaneously and by changing the ratio of these units into the main chain of the same molecule. Also, such a copolymerization ratio as to increase photo-induced birefringence with decreasing scattering caused by crystallinity exists. Therefore, it is possible to attain both a reduction in scattering and an improvement in photo-induced anisotropy, making it possible to produce a thick film medium having higher record retentivity.

Also, a novel dicarboxylic acid monomer and a novel polyester for an optical recording material which embodies the invention can be provided. The polyester synthesized using the dicarboxylic acid monomer is useful as a binder polymer for controlling dye concentration. Also, a photo-responsive polyester synthesized using the dicarboxylic acid monomer is suitable for optical recording materials, particularly, optical recording materials for hologram recording.

Using the aforementioned optical recording material, a highly sensitive and thick medium which attains high diffraction efficiency can be provided. Accordingly, it is possible to improve volume multiplicity outstandingly in, particularly, hologram recording and the optical recording medium of the invention may be used as a large scale optical recording medium. Also, the optical recording medium of the invention can record the direction of polarization of signal light. This ensures that the optical recording medium of the invention can be used as media used in a large scale recording system and an optical processing utilizing polarization recording. It is also possible to provide a large scale optical recording reproducing device using this these optical recording media.

According to the invention, a novel dicarboxylic acid monomer and a novel polyester are provided. Also, according to the invention, optical recording materials (e.g., a photo-responsive high-molecular compound, a photo-responsive high-molecular composition and a polyester) which can control the absorbance of a medium, can maintain high recording sensitivity and high diffraction efficiency and can also be made to be thick by the control of the absorption amount of a recording material, and the starting materials (a dicaboxylic acid monomer) of these optical recording materials can be provided. Further, according to the invention, optical recording materials which can control crystallinity, can maintain high record retentivity and prevent the generation of noises by the control of crystallinity to thereby enable the layer thickness to be thickened, and the starting materials (a dicaboxylic acid monomer) of these optical recording materials can be provided.

Also, according to the optical recording medium of the invention, a photosensitive layer can be made thick without impairing recording characteristics, whereby such an effect that large scale recording is attained can be obtained.

Further, according to the optical recording and reproduceinging device of the invention, such an effect can be obtained that it is possible to record and reproduce large scale data.

What is claimed is:

1. A photo-responsive high-molecular compound comprising an aromatic ring in a main chain, a photo-responsive group that is geometrically isomerized by light radiation, and a liquid crystal linear mesogen group, wherein the photo-responsive group and the liquid crystal linear mesogen group are respectively bonded with the aromatic ring as side chains, the liquid crystal linear mesogen group contains a biphenyl skeleton, and the compound comprises a repeat unit represented by the following general formula (10):

General formula 10

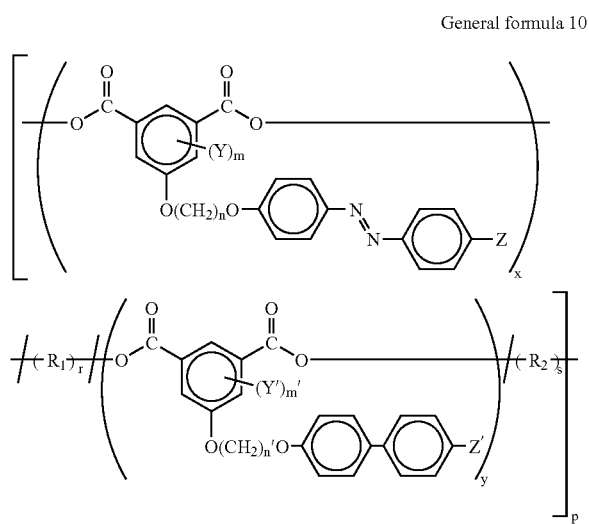

wherein $R_1$ and $R_2$ each independently represent a hydrocarbon chain including a substituted or unsubstituted aromatic group, a substituted or unsubstituted aliphatic group, or both of a substituted or unsubstituted aromatic group and a substituted or unsubstituted aliphatic group, wherein $R_1$ represents a structural unit capable of forming a liquid-crystalline or crystalline polymer and $R_2$ represents a structural unit capable of forming an amorphous polymer; Y and Y' respectively represent a hydrogen atom or a lower alkyl group; Z and Z' each independently represent a hydrogen atom, a methyl group, a methoxy group, a cyano group or a nitro group; R represents a hydrocarbon chain including a substituted or unsubstituted aromatic group, a substituted or unsubstituted aliphatic group or both of a substituted or unsubstituted aromatic group and a substituted or unsubstituted aliphatic group; m and m' each independently represent an integer from 1 to 3; n and n' each independently represent an integer from 2 to 18; p represents an integer from 5 to 2000; and x, y, r and s each independently represent the abundance ratio of the repeat unit wherein x, y, r and s satisfy the following relations: $0<x<1$, $0<y<1$, $x+y=1$, $0<r<1$, $0<s<1$ and $r+s=1$, wherein r is in a range from about 0.2 to about 0.95 and s is in a range from about 0.05 to about 0.8, and said photo-responsive high-molecular compound is present in a photosensitive layer having a thickness of 50 μm or more.

2. A photo-responsive high-molecular compound according to claim 1, wherein n and n' represent different integers.

3. An optical recording medium provided with a photosensitive layer containing a photo-responsive high-molecular compound according to claim 1, wherein information is recorded in the photosensitive layer by utilizing at least one of a change in absorption, a change in refractive index, and a change in photoisomerization, due to light radiation.

4. An optical recording medium according claim 3, wherein recording of a hologram is independently possible in each of a case where a polarization direction of light that is incident on an object and a polarization direction of reference light are parallel to each other, and a case where polarization direction of light that is incident on an object and a polarization direction of reference light are perpendicular to each other.

5. An optical recording medium according claim 3, wherein recording of a hologram by the amplitude, phase and direction of polarization of object light is possible.

6. An optical recording reproducing device for recording and/or reproducing information by using an optical recording medium provided with a photosensitive layer containing a photo-responsive high-molecular compound according to claim 1, wherein information is recorded in the photosensitive layer by utilizing at least one of a change in absorption, a change in refractive index, and a change in photoisomerization, due to light radiation.

7. A photo-responsive high-molecular compound according to claim 1, wherein $R_2$ in the general formula (10) is a functional group represented by the following General formula (8)

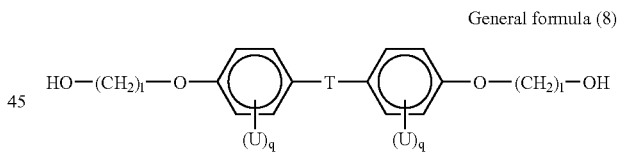

wherein U represents a hydrogen atom, a halogen atom, a substituted or unsubstituted lower alkyl group, a substituted or unsubstituted lower alkenyl group, or a substituted or unsubstituted lower alkinyl group; T represents a sulfone bond; q denotes an integer from 1 to 4; and l denotes an integer from 2 to 18.

* * * * *